US009397949B2

(12) United States Patent
Sonoda et al.

(10) Patent No.: US 9,397,949 B2
(45) Date of Patent: Jul. 19, 2016

(54) TERMINAL, CONTROL DEVICE, COMMUNICATION METHOD, COMMUNICATION SYSTEM, COMMUNICATION MODULE, PROGRAM, AND INFORMATION PROCESSING DEVICE

(75) Inventors: Kentaro Sonoda, Tokyo (JP); Hideyuki Shimonishi, Tokyo (JP); Masayuki Nakae, Tokyo (JP); Masaya Yamagata, Tokyo (JP); Yoichiro Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 54 days.

(21) Appl. No.: 13/818,293

(22) PCT Filed: Apr. 16, 2012

(86) PCT No.: PCT/JP2012/002631
§ 371 (c)(1),
(2), (4) Date: Feb. 21, 2013

(87) PCT Pub. No.: WO2012/144190
PCT Pub. Date: Oct. 26, 2012

(65) Prior Publication Data
US 2013/0148500 A1 Jun. 13, 2013

(30) Foreign Application Priority Data

Apr. 18, 2011 (JP) ................................. 2011-092319

(51) Int. Cl.
*H04L 12/851* (2013.01)
*H04L 12/721* (2013.01)
*H04L 12/725* (2013.01)

(52) U.S. Cl.
CPC .......... *H04L 47/2433* (2013.01); *H04L 45/302* (2013.01); *H04L 45/38* (2013.01)

(58) Field of Classification Search
None
See application file for complete search history.

(56) References Cited

U.S. PATENT DOCUMENTS 7,373,660 B1 * 5/2008 Guichard et al. ............... 726/15
7,596,811 B2    9/2009 Lloyd et al.
(Continued)

FOREIGN PATENT DOCUMENTS

EP    1995938 A1    11/2008
JP    2003-87298 A   3/2003
(Continued)

OTHER PUBLICATIONS

Notice of Grounds for Rejection dated May 28, 2013, with English translation.
(Continued)

*Primary Examiner* — Hassan Kizou
*Assistant Examiner* — Hashim Bhatti
(74) *Attorney, Agent, or Firm* — McGinn IP Law Group, PLLC

(57) ABSTRACT

A terminal communicating via a network including a forwarding device(s) for forwarding a packet and a control device for controlling the forwarding device(s) in accordance with a request from the forwarding device, includes: a communication unit that receives a processing rule specifying a process of adding, to a packet, quality information related to communication quality with respect to the terminal, from the control device, a memory unit that stores the received processing rule, and a processing unit that in a case of communicating via the network, adds quality information to a packet in accordance with a processing rule that corresponds to the packet by referring to the processing rule stored in the memory unit.

29 Claims, 24 Drawing Sheets

(56) References Cited

U.S. PATENT DOCUMENTS

| | | | |
|---|---|---|---|
| 7,710,877 | B2 | 5/2010 | Watanabe |
| 7,818,805 | B2 | 10/2010 | Lloyd et al. |
| 8,051,481 | B2 | 11/2011 | Baldonado et al. |
| 2003/0048773 | A1 | 3/2003 | Wu et al. |
| 2004/0147264 | A1 | 7/2004 | Ogawa |
| 2005/0198506 | A1* | 9/2005 | Qi et al. .................. 713/170 |
| 2006/0136987 | A1* | 6/2006 | Okuda ...................... 726/1 |
| 2007/0208854 | A1* | 9/2007 | Wiryaman et al. ............ 709/225 |
| 2008/0130601 | A1 | 6/2008 | Kim et al. |
| 2008/0189769 | A1 | 8/2008 | Casado et al. |
| 2008/0229385 | A1* | 9/2008 | Feder et al. .................. 726/1 |
| 2008/0267085 | A1* | 10/2008 | Bae et al. .................. 370/252 |
| 2008/0310303 | A1 | 12/2008 | Wang et al. |
| 2009/0138577 | A1 | 5/2009 | Casado et al. |
| 2010/0130170 | A1* | 5/2010 | Liu et al. .................. 455/411 |
| 2010/0142379 | A1* | 6/2010 | Kim et al. .................. 370/241 |
| 2011/0261825 | A1 | 10/2011 | Ichino |
| 2012/0054079 | A1 | 3/2012 | Hayashi |
| 2012/0113989 | A1* | 5/2012 | Akiyoshi .................. 370/392 |
| 2013/0114460 | A1* | 5/2013 | Rubio Vidales et al. ...... 370/252 |
| 2013/0121206 | A1* | 5/2013 | Turanyi et al. ................ 370/254 |

FOREIGN PATENT DOCUMENTS

| | | | |
|---|---|---|---|
| JP | 2003-333091 | A | 11/2003 |
| JP | 2004-064182 | A | 2/2004 |
| JP | 2004-235800 | A | 8/2004 |
| JP | 2007-214971 | A | 8/2007 |
| JP | 2008-512970 | A | 4/2008 |
| JP | 2009-246957 | A | 10/2009 |
| JP | 2010-541426 | A | 12/2010 |
| KR | 10-2010-0029125 | A | 3/2010 |
| WO | WO 2006/029399 | A2 | 3/2006 |
| WO | WO 2006/087817 | A1 | 8/2006 |
| WO | WO2008/095010 | A1 | 8/2008 |
| WO | WO 2010/103909 | A1 | 9/2010 |
| WO | WO2011/040511 | A1 | 4/2011 |

OTHER PUBLICATIONS

Yohei Yoshida, "programmable flow-switch, capable of setting communication routes arbitrarily, realizing virtualization among data centers", Nikkei Computer Jul. 22, 2009 pp. 114-116.

Notice of Grounds for Rejection dated Mar. 4, 2014, with partial English translation.

Korean Office Action dated Feb. 21, 2014, with English translation.

International Search Report in PCT/JP2011/002631 dated May 15, 2011 (English Translation Thereof).

Nick McKeown et al., "OpenFlow: Enabling Innovation in Campus Networks", (online), (retrieved on Jul. 6, 2010), Internet <URL: http://www.openflowswitch.org//documents/openflow-wp-latest.pdf>.

"OpenFlow Switch Specification" Version 1.0.0. (Wire Protocol 0x01) (retrieved on Jul. 6, 2010), Internet <URL: http://www.openflowswitch.org/documents/openflow-spec-v1.0.0.pdf>.

Extended European Search Report dated Aug. 7, 2014.

"Openflow Switch Specification Version 1.1.0 Implemented", Internet Citation, Feb. 28, 2011; pp. 1-56; XP008166938, URL:http://web.archive.org/web/20110516201950/http://www.openflow.org/documents/open flow-spec-v1.1.0.pdf.

* cited by examiner

FIG. 8

| USER ID | ROLE ID | ATTRIBUTE |
|---|---|---|
| user1 | role_0001<br>role_0002 | IP:192.168.100.1<br>MAC:00-00-00-44-55-66 |
| user2 | role_0002 | IP:192.168.100.2<br>MAC:00-00-00-77-88-99 |
| .. | .. | .. |

FIG. 9

| ROLE ID | RESOURCE GROUP ID | ACCESS RIGHTS |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| .. | .. | .. |

FIG. 10

| RESOURCE GROUP ID | RESOURCE ID | RESOURCE ATTRIBUTE |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| resource_group_0002 | resource_000X | IP:YYY.YYY.Y.Y |
| .. | .. | .. |

FIG. 11

| SOURCE | DESTINATION | ACCESS RIGHTS | CONDITION (OPTION) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| 192.168.100.1 | 192.168.0.3 | deny | |
| .. | .. | .. | .. |

FIG. 17

| SOURCE | DESTINATION | ACCESS RIGHTS | CONDITION (OPTION) |
|---|---|---|---|
| IP:192.168.100.0/24 | 192.168.0.3 | deny | |
| .. | .. | .. | .. |

FIG. 24

HEADER FIELDS; MATCHING RULE

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

TERMINAL, CONTROL DEVICE, COMMUNICATION METHOD, COMMUNICATION SYSTEM, COMMUNICATION MODULE, PROGRAM, AND INFORMATION PROCESSING DEVICE

REFERENCE TO RELATED APPLICATION

This application is based upon and claims the benefit of the priority of Japanese patent application No. 2011-092319, filed on Apr. 18, 2011, the disclosure of which is incorporated herein in its entirety by reference thereto.

TECHNICAL FIELD

The present invention relates to a terminal, a control device, a communication method, a communication system, a communication module, a computer program, and an information processing device, and relates to communication technology in a network in which the control device performs centralized control of forwarding devices.

BACKGROUND

In recent years, technology known as OpenFlow has been proposed (refer to Patent Literature (PTL) 1, and Non-Patent Literatures (NPLs) 1 and 2). In OpenFlow, communication is treated as end-to-end flow, and path control, recovery from failure, load balancing, and optimization are performed in flow units. An OpenFlow switch as specified in Non-Patent Literature 2 is provided with a secure channel for communication with an OpenFlow controller, and operates according to a flow table in which appropriate addition or rewriting is instructed by the OpenFlow controller. In the flow table are definitions of sets of matching rules (Header fields) for collation with packet headers, flow statistical information (Counters), and actions (Actions) defining processing content, for each flow (refer to FIG. 24).

For example, when an OpenFlow switch receives a packet, an entry is searched for that has a matching rule (refer to header field in FIG. 24) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, and the like) described in an Actions field of the entry in question, for the received packet. On the other hand, as a result of the search, in a case where an entry matching the received packet is not found, the OpenFlow switch transmits a request for entry setting with respect to the OpenFlow controller via a secure channel, that is, a request to determine a path of the packet based on source and destination of the received packet. The OpenFlow switch receives a flow entry corresponding to the request and updates the flow table. In this way, the OpenFlow switch uses the entry stored in the flow table as a processing rule to perform packet forwarding.

CITATION LIST

Patent Literature

[PTL 1]
International Publication No. 2008/095010
[PTL 2]
Japanese Patent Kokai Publication No. JP-P2004-064182A

Non Patent Literature

[NPL 1]
Nick McKeown, and 7 others, "OpenFlow: Enabling Innovation in Campus Networks", [online] [search conducted Apr. 4, 2011] Internet URL: http://www.openflowswitch.org//documents/openflow-wp-latest.pdf
[NPL 2]
"OpenFlow: Switch Specification" Version 1.0.0. (Wire Protocol 0x01), [online] [search conducted Apr. 4, 2011] Internet URL: http://www.openflowswitch.org/documents/openflow-spec-v1.0.0.pdf

SUMMARY

The entire disclosures of the abovementioned Patent Literatures 1 and 2 and Non-Patent Literatures 1 and 2 are incorporated herein by reference thereto. The following analysis is given by the present invention. In the technology disclosed in Patent Literature 1 and Non-Patent Literatures 1 and 2, a controller determines an entry for packet processing in accordance with a request transmitted from a switch, and sets the determined entry with respect to the switch. In such a centralized control type of communication system, there is a problem of load on the controller. A reason for this is that, since the controller centrally controls a plurality of switches and calculates entries with respect to requests transmitted from the plurality of switches, the processing load on the controller increases.

Furthermore, the controller may set an entry prescribing processing for rewriting header content of a packet with respect to a switch. In this type of case, there is a problem in that the load required for packet processing in a switch increases.

Patent Literature 2 discloses a gateway control device for controlling a gateway. However, Patent Literature 2 does not disclose a measure for reducing load on a gateway or a gateway control device.

According to a first aspect, there is provided a terminal communicating via a network including at least one forwarding device for forwarding a packet, and a control device for controlling the forwarding device(s) in accordance with a request from the forwarding device. The terminal includes: a communication unit that receives a processing rule specifying a process of adding, to a packet, quality information related to communication quality with respect to the terminal, from the control device; and a memory unit that stores the received processing rule. The terminal further includes a processing unit that in a case of communicating via the network, adding quality information to a packet in accordance with a processing rule that corresponds to the packet by referring to the processing rule stored in the memory unit.

According to a second aspect, there is provided a control device that sets a processing rule for a packet with respect to at least one forwarding device for forwarding packets. The control device includes: a request receiving unit that receives an access request transmitted from a terminal for accessing a network in which the forwarding device processes a packet in accordance with the processing rule; and a control unit that generates a processing rule specifying a process of adding quality information related to communication quality with respect to the terminal, to the packet. The control device further includes a communication unit that transmits the generated processing rule to the terminal.

According to a third aspect, there is provided a communication method for controlling at least one terminal communicating via a network including at least one forwarding device for forwarding a packet, and a control device for controlling the forwarding device in accordance with a request from the forwarding device. The method includes: a receiving step of receiving a processing rule specifying a process of adding, to a packet, quality information related to service quality with respect to the terminal, from the control device; a step of storing the received processing rule; and a processing step of in a case of communicating via the network, adding quality information to a packet in accordance with a processing rule that corresponds to the packet by referring to the stored processing rule. It is to be noted that the present method is linked with a specific apparatus, which is a terminal for communicating via a network including at least one forwarding node and a control device.

According to a fourth aspect, there is provided a communication system including at least one forwarding device for forwarding a packet, a control device for controlling the forwarding device(s) in accordance with a request from the forwarding device, and at least one terminal communicating via a network including the forwarding device(s) and the control device. The control device comprises a control unit that determines a processing rule specifying a process of adding, to a packet, quality information related to service quality with respect to the terminal. The terminal comprises: a communication unit that receives the processing rule determined by the control device, from the control device; a memory unit that stores the received processing rule; and a processing unit that in a case of communicating via the network, adds quality information to a packet in accordance with a processing rule that corresponds to the packet by referring to the processing rule stored in the memory unit.

According to a fifth aspect, there is provided a communication module installed in a terminal communicating via a network including at least one forwarding device for forwarding a packet, and a control device for controlling the forwarding device(s) in accordance with a request from the forwarding device. The module includes: a communication unit that receives a processing rule specifying a process of adding, to a packet, quality information related to service quality with respect to the terminal, from the control device; a memory unit that stores the received processing rule; and a processing unit that in a case where the terminal communicates via the network, adds quality information to a packet in accordance with a processing rule that corresponds to the packet by referring to the processing rule stored in the memory unit.

According to a sixth aspect, there is provided a computer-readable storage medium storing a computer program that executes, in a terminal communicating via a network including at least one forwarding device for forwarding a packet, and a control device for controlling the forwarding device(s) in accordance with a request from the forwarding device, a process of receiving a processing rule specifying a process of adding, to a packet, quality information related to service quality with respect to the terminal, from the control device; a process of storing the received processing rule; and a process of in a case where the terminal communicates via the network, adds quality information to a packet in accordance with a processing rule that corresponds to the packet by referring to the stored processing rule. It is to be noted that the computer program can be recorded in a computer readable (non-transient) recording medium. That is, the present invention can be embodied as a computer program product.

According to a seventh aspect, there is provided an information processing device for transmitting to a terminal a computer program for executing, in a terminal that communicates via a network including at least one forwarding device for forwarding a packet, and a control device for controlling the forwarding device(s) in accordance with a request from the forwarding device the following processing: a process of receiving a processing rule specifying a process of adding, to a packet, quality information related to service quality with respect to the terminal, from the control device; a process of storing the received processing rule; and a process of in a case where the terminal communicates via the network, adds quality information to a packet in accordance with a processing rule that corresponds to the packet, by referring to the stored processing rule stored.

The meritorious effects of the present invention are summarized as follows.

According to the present invention, with technology for performing communication by the control device centrally controlling forwarding devices, it is possible to reduce load on the control device and the forwarding devices.

BRIEF DESCRIPTION OF DRAWINGS

FIG. 8 is a diagram showing an example of authentication information;

FIG. 9 is a diagram showing an example of communication policy information;

FIG. 10 is a diagram showing an example of resource information;

FIG. 11 is a diagram showing an example of a communication policy;

FIG. 17 is a diagram showing an example of a communication policy;

FIG. 24 is a diagram describing related technology.

PREFERRED MODES

Figure 1:
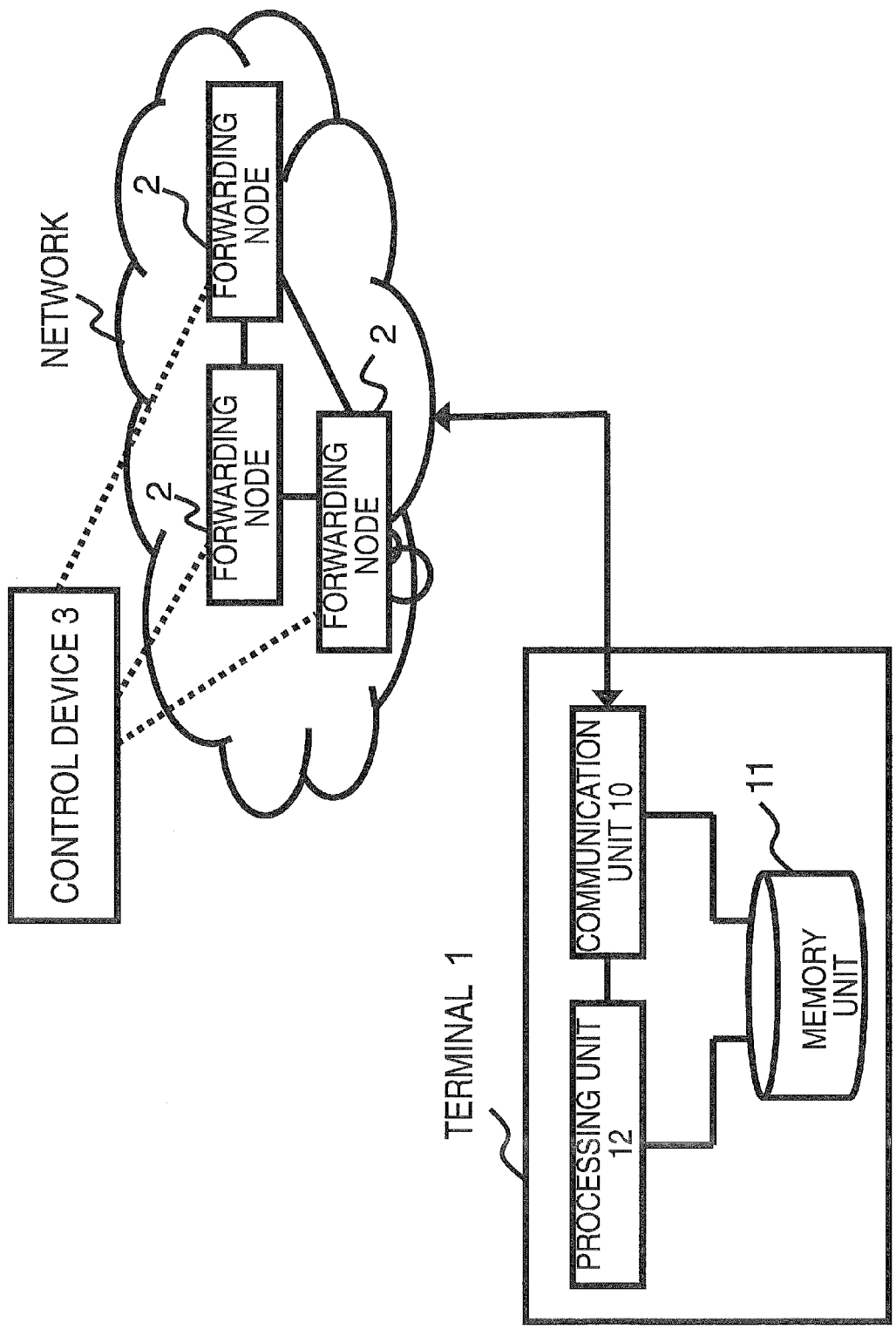
FIG. 1 is a diagram showing an example of a configuration of the present invention.
Figure 2:
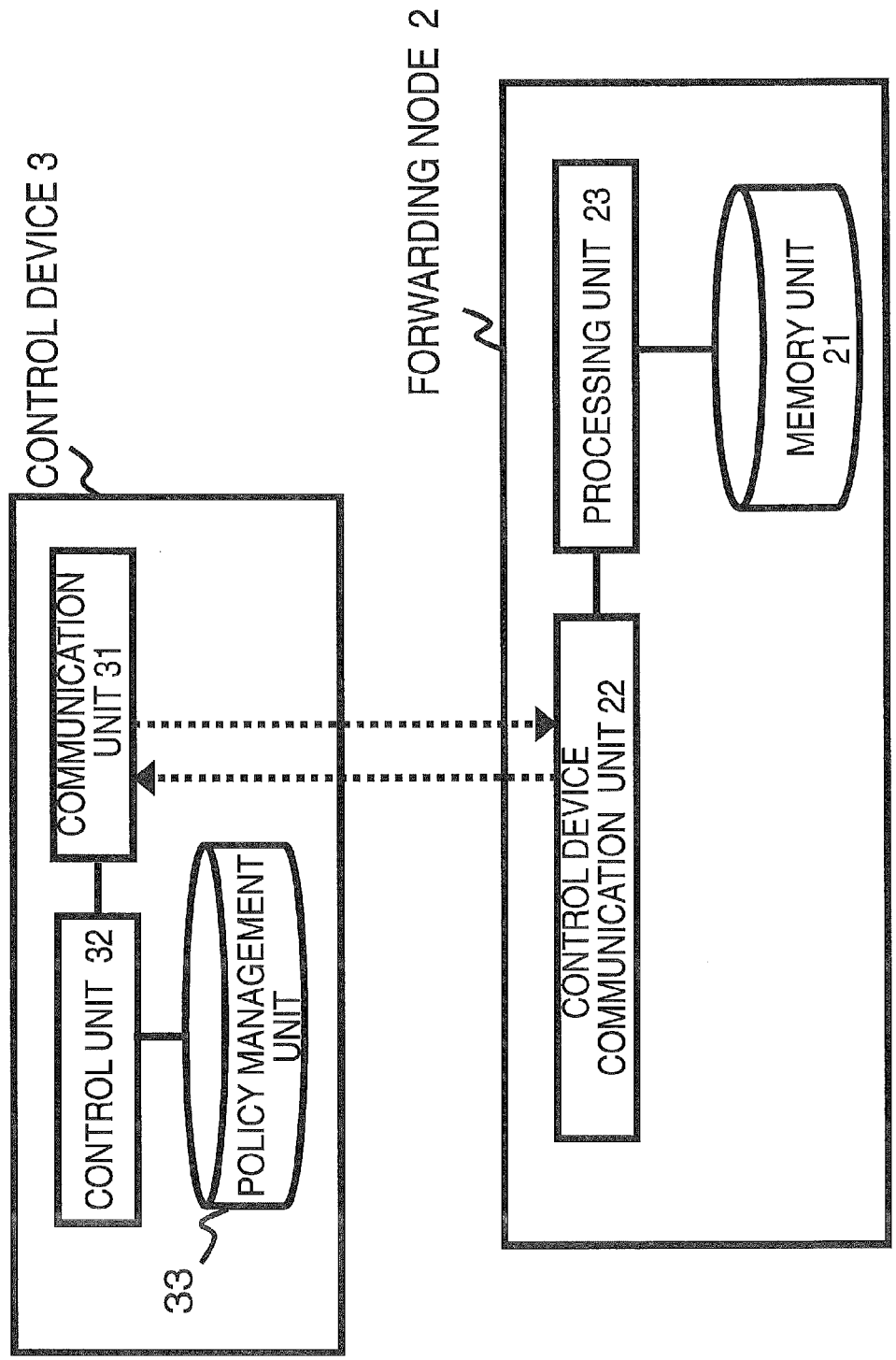
FIG. 2 is a diagram showing an example of a configuration of the present invention.

First, an outline of an exemplary embodiment of the present invention is described. FIG. 1 is a diagram showing a configuration of a communication network and a configuration of a terminal 1. FIG. 2 is a diagram showing a configuration of a forwarding node 2 and a control device 3. It is to be noted that reference symbols (signs) attached to the drawings are added for convenience to respective elements as an example in order to aid understanding. The reference symbols are not intended to limit the invention to modes of the drawings shown.

Figure 3:
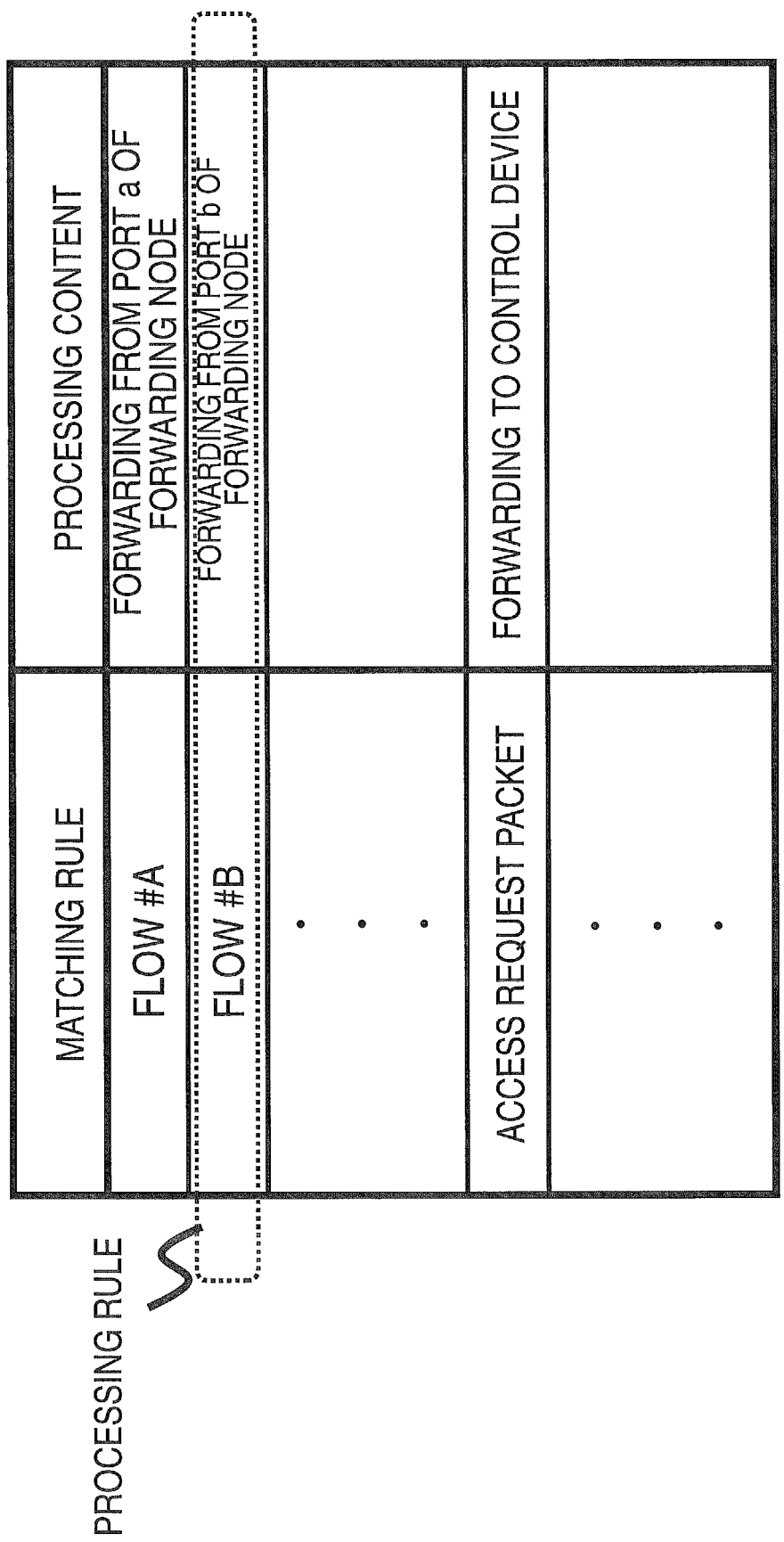
FIG. 3 is a diagram showing an example of a table storing processing rules.

On receiving a packet, a forwarding node 2 processes the packet in accordance with a processing rule corresponding to the packet. The processing rule specifies processing content for the packet. An example of a configuration of a processing rule is shown in FIG. 3. The processing rule, for example, includes a matching rule for matching a packet and the processing rule, and processing content for the packet that matches the processing rule. On receiving the packet, a processing unit 23 searches for a processing rule corresponding to the packet from a memory unit 21. That is, the processing unit 23 searches in a table of a configuration exemplified in FIG. 3, which is stored in the memory unit 21. For example, if the packet belongs to a "flow A", it matches a matching rule for "flow A". It is to be noted that a "flow" is a sequence of packets identified in accordance with packet content (information such as packet source and destination, a combination of plural information items included in the packet and the like). In a case of a processing rule corresponding to a packet being stored in the memory unit 21, the processing unit 23 processes the packet in accordance with the retrieved processing rule. For example, in an example in FIG. 3, if a packet belongs to the "flow A", the processing unit 23 executes processing content of "forward from port 'a' of forwarding node". In a case where a processing rule corresponding to a packet is not stored in the memory unit 21, a control device communication unit 22 transmits a request to set a processing rule, with respect to the control device 3.

The control device 3 controls packet processing by the forwarding node 2. When a communication unit 31 receives a request to set a processing rule from the forwarding node 2, a control unit 32 determines a processing rule corresponding to the setting request. The communication unit 31 transmits the processing rule determined by the control unit 32 to the forwarding node 2. The processing rule specifies processing content for a packet such as, for example, packet transmission from a specified port, flooding, dropping, packet header rewriting, and the like.

The control device 3 sets processing rules not only for the forwarding node 2, but also for a terminal 1 that communicates via a communication network including the forwarding node 2 and the control device 3. Furthermore, the terminal 1 executes packet processing in accordance with a set processing rule.

The terminal 1 transmits an access request to the communication network via a communication unit 10. It is to be noted that the terminal 1 is a communication terminal such as a personal computer, a handheld device, or the like. The terminal 1 may have either a wired or wireless method of communication.

On detecting an access request from the terminal 1, the forwarding node 2 forwards the access request to the control device 3. For example, the control device 3 sets in advance a processing rule corresponding to a packet for requesting access (for example, an authentication packet or a login packet) to the memory unit 21 of the forwarding node 2. As shown in an example in FIG. 3, the control device 3 sets a processing rule in which a matching rule is "access request packet", and corresponding processing content is "forward to control device". The processing rule corresponding to the access request packet specifies, for example, processing for forwarding the access request packet to the control device 3. On receiving the access request packet, the processing unit 23 of the forwarding node 2 forwards the access request packet to the control device 3, in accordance with the processing rule corresponding to the access request packet.

When the control device 3 receives the access request packet forwarded from the forwarding node 2, the control unit 32 of the control device 3 refers to a policy management unit 33 and retrieves a policy corresponding to a user of the terminal. It is to be noted that the policy management unit 33 may store a policy that is set for each terminal. The control unit 32 determines a processing rule set in the terminal 1, based on the retrieved policy. The communication unit 31 transmits the determined processing rule to the terminal 1. It is to be noted, for example, that the control device 3 may set a period of validity for the determined processing rule and transmit this to the terminal 1. In a case where a period of validity is set, the processing rule set in the terminal 1 is deleted from the terminal 1 when the period of validity has passed. It is to be noted that FIG. 2 shows an example where the policy management unit 33 is included in the control device 3, but the policy may be managed by a device other than the control device 3.

Furthermore, the control device 3 may determine the processing rule set in the terminal 1 based on information managed by the control device 3, without referring to the policy management unit 33.

In addition, the control device 3, for example, may set a processing rule for a forwarding node corresponding to a processing rule for a terminal set in the terminal, in a forwarding node 2. For example, in a case where the terminal 1 executes a rewriting process for some packets in accordance with a processing rule set in the terminal 1, the control terminal 3 may set a processing rule matching rewritten content within a packet, in the forwarding node 2.

In a case where the communication unit 10 of the terminal 1 receives a processing rule from the control device 3, the terminal 1 sets the processing rule in the memory unit 11. When the processing unit 12 of the terminal 1 transmits or receives a packet to or from a communication network, the processing unit 12 searches for a processing rule corresponding to the transmitted or received packet, from the memory unit 11. In a case where a processing rule corresponding to the transmitted or received packet is stored in the memory unit 11, the processing unit 12 processes the packet in accordance with the processing rule. The processing unit 12, for example, executes processing for rewriting some packets to be transmitted or received, or packet dropping processing, in accordance with the processing rule. In a case where a processing rule corresponding to the transmitted or received packet is not stored in the memory unit 11, the processing unit 12 may transmit or receive the packet without executing processing corresponding to the packet, or may perform packet dropping. However, packet processing in a case where a processing rule corresponding to the transmitted or received packet is not stored in the memory unit 11 is not limited to this.

Figure 4:
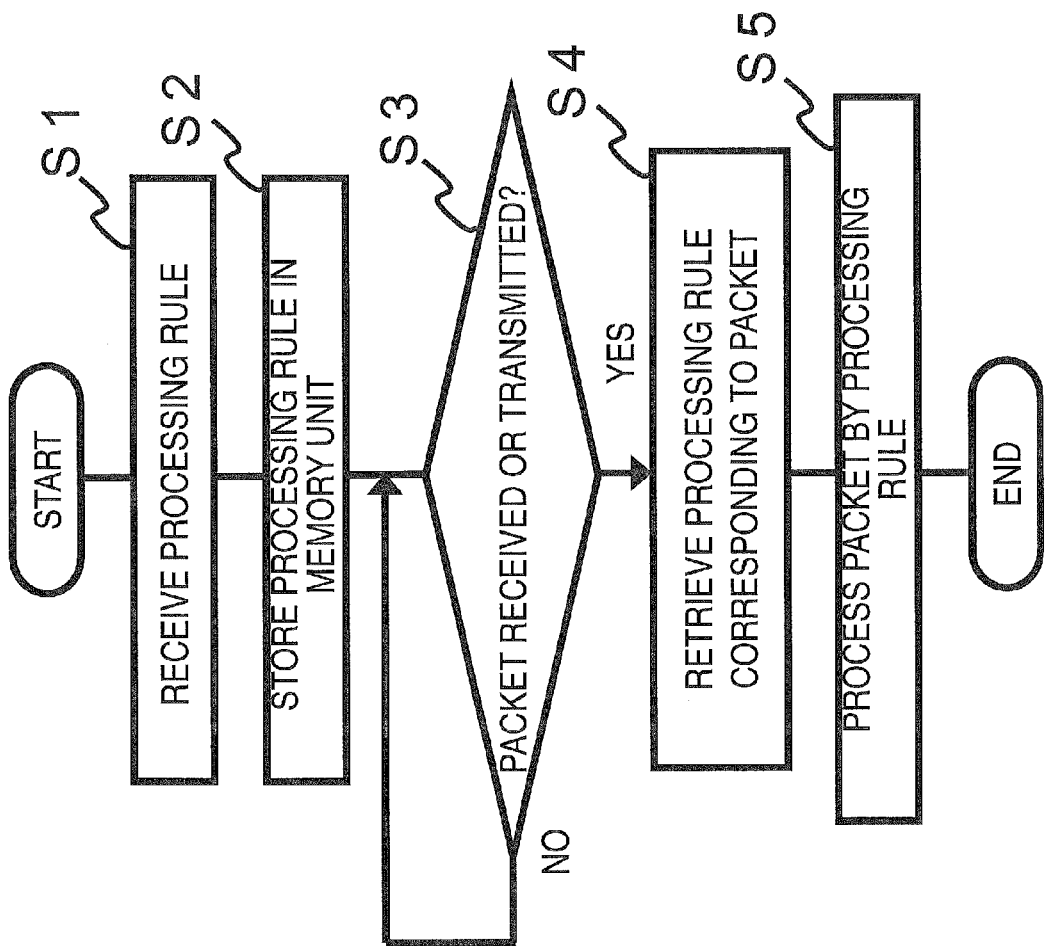
FIG. 4 is a flowchart showing an example of operations of the present invention.

Next, a description is given of operations of the terminal 1 and the control device 3, making reference to FIG. 4 and FIG.

5. FIG. 4 is a flowchart showing an example of operations of the terminal 1. In a case of receiving a processing rule from the control device 3 (S1), the terminal 1 stores the received processing rule in the memory unit 11 (S2).

In a case of packet transmission or reception with respect to the communication network (Yes in S3), the terminal 1 retrieves a processing rule corresponding to the transmitted or received packet (S4).

In a case of a processing rule corresponding to the transmitted or received packet being stored in the memory unit 11, the terminal 1 processes the transmitted or received packet in accordance with the processing rule (S5).

Figure 5:
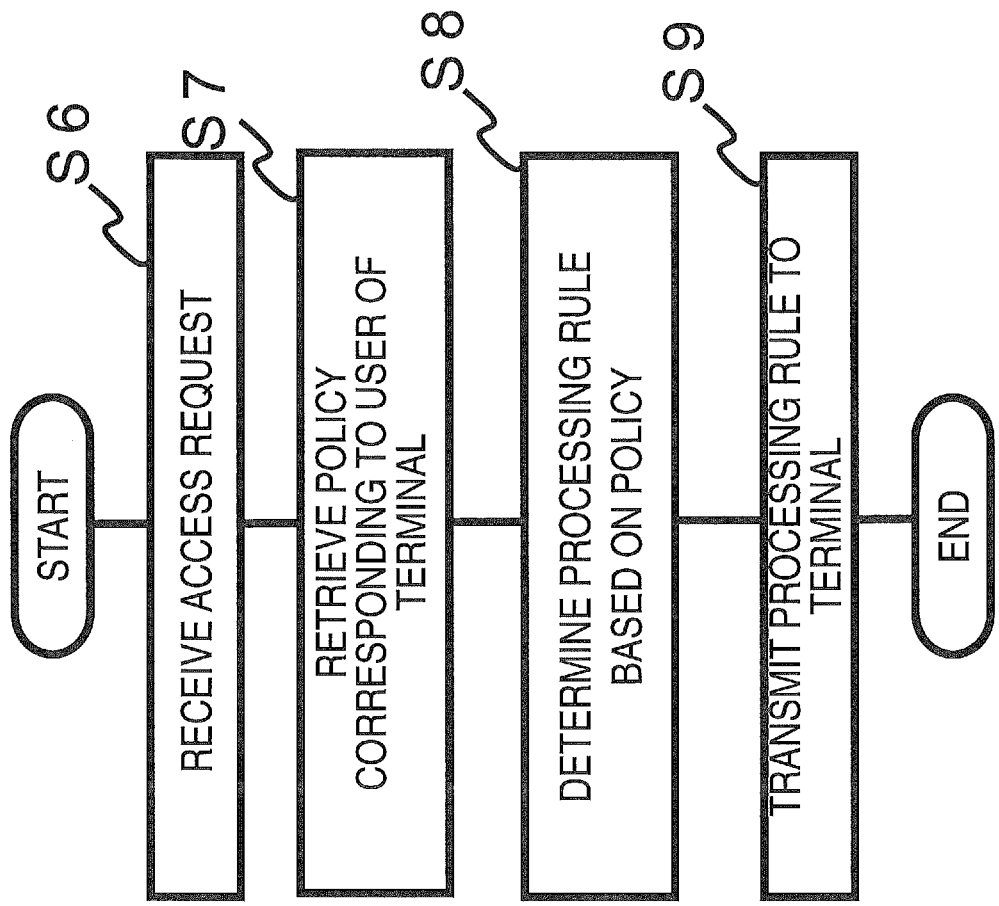
FIG. 5 is a flowchart showing an example of operations of the present invention.

FIG. 5 is a flowchart showing an example of operations of the control device 3. On receiving an access request from the terminal 1 (S6), the control device 3 retrieves a policy corresponding to a user of the terminal, from the policy management unit 33 (S7).

The control device 3 determines a processing rule to be set in the terminal 1 based on the retrieved policy (S8), and transmits to the terminal 1 (S9).

The control device 3 sets the processing rule with regard to the terminal 1, and the terminal 1 itself executes packet processing corresponding to the processing rule. Since the terminal 1 executes packet processing such as rewriting of some packets according to the processing rule, instead of the forwarding node 2, packet processing load on the forwarding node 2 is greatly reduced. Furthermore, since the processing device 3 can set a processing rule corresponding to content of a processing rule for a terminal set for the terminal 1, in advance in the forwarding node 2, it is possible to curtail requests to the control device 3 generated due to the processing rule not being set in the forwarding node 2. Therefore, the processing load on the control device 3 is greatly reduced.

First Exemplary Embodiment

Figure 6:
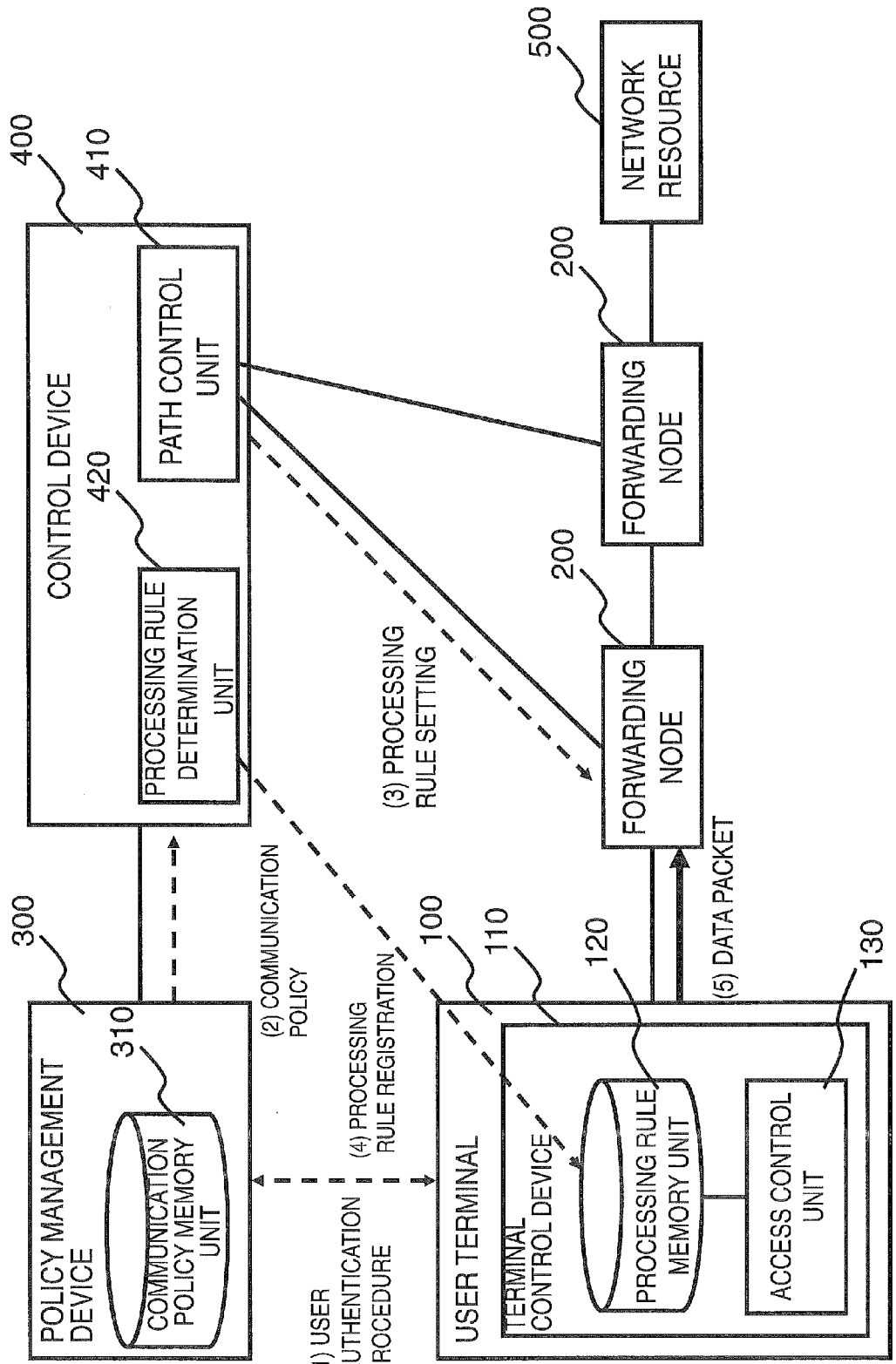
FIG. 6 is a diagram showing an example of a configuration of a first exemplary embodiment of the present invention.

Next, a description is given concerning an outline of a first exemplary embodiment of the present invention, making reference to the drawings. FIG. 6 shows an example of a system configuration in the first exemplary embodiment. Referring to FIG. 6, the configuration is shown to include a user terminal 100, a plurality of forwarding nodes 200, a policy management device 300, and a control device 400.

The plurality of forwarding nodes 200 carry out processing of packets transmitted from the user terminal, in accordance with a processing rule set by the control device 400.

A terminal control device 110 inside the user terminal 100 stores processing rules set by the control device 400, and controls packets transmitted by the user terminal based on a processing rule.

More specifically, the terminal control device 110 is provided with a processing rule memory unit 120 that stores processing rules to determine whether or not to forward a packet transmitted from a processing rule determination unit 420, and an access control unit 130 for allowing or denying access transmitted from the user terminal, based on a processing rule stored in the processing rule memory unit 120. That is, the access control unit 130 confirms whether or not a processing rule corresponding to a packet transmitted from the terminal 100 is stored in the processing rule memory unit 120. In a case where a processing rule corresponding to the packet transmitted from the terminal 100 is stored therein, the access control unit 130 confirms processing content specified in the processing rule. In a case where the processing content denies forwarding of the packet, the access control unit 130 does not forward the packet to a communication network configured by the forwarding nodes 200, but executes an access restriction such as dropping the packet or the like.

The policy management device 300 manages the communication policy and notifies the communication policy assigned to a user for whom authentication has succeeded, to the control device 400.

More specifically, the policy management device 300 includes a communication policy memory unit 310 that associates a role assigned to the user and access rights set for each role. The policy management device 300 provides information concerning the access rights corresponding to the role of the user for whom authentication has succeeded, to the control device 400, based on a result of user authentication.

The control device 400 sets a processing rule specifying processing content of a packet, with respect to the forwarding nodes 200. It is to be noted that reference symbols attached to the drawings are added for convenience to respective elements as an example in order to aid understanding. The reference symbols are not intended to limit the invention to modes of the drawings shown.

More specifically, the control device 400 determines a path between the terminal 100 of the user for whom authentication has succeeded, and a network resource 500 which the user can access, based on information concerning access rights received from the policy management device 300. The control device 400 includes a path control unit 410 that sets a processing rule in a forwarding node 200 in a determined path. With regard to the processing rule set by the path control unit 410 in the forwarding node 200, the control device 400 is provided with a processing rule determination unit 420 that transmits a processing rule determining whether or not to forward a packet from the terminal 100, to the terminal control device 110 of the user terminal 100.

The control device 400 may set a period of validity for a processing rule transmitted to the user terminal 100. In this case, the terminal 100 deletes the processing rule for which the period of validity has elapsed. It is to be noted that in a case where the processing rule determination unit 420 transmits a processing rule denying packet forwarding from the terminal 100, the path control unit 410 need not set a processing rule corresponding to a determined path, with regard to the forwarding node 200.

By setting the processing rule as described above, it is possible to determine the accessible network resource 500, in accordance with the role assigned to the user, and furthermore, it is possible to set a path to give access for each flow. In addition, by setting the abovementioned processing rule, it is possible to execute an access restriction in the user terminal 100, with regard to a flow for which access by the user is denied, among packet flows transmitted by the user.

Therefore, since the packet for which access is restricted has the access restricted by the terminal 100 without being transmitted to a forwarding node 200, processing load in the forwarding node 200 is reduced. Since by access restriction by the terminal 100 there is a decrease in packets sent at the occasion of a request to set a processing rule to be transmitted to the control device from the forwarding node 200, the load on the control device is greatly reduced.

It is to be noted that in a case where a period of validity is provided in the processing rule, and the period of validity has elapsed from a setting being performed in the forwarding node 200 and the access control unit 130 of the user terminal 100, or from a packet matching a matching rule finally being received, the processing rule that denies forwarding of the packet may be deleted.

Figure 7:
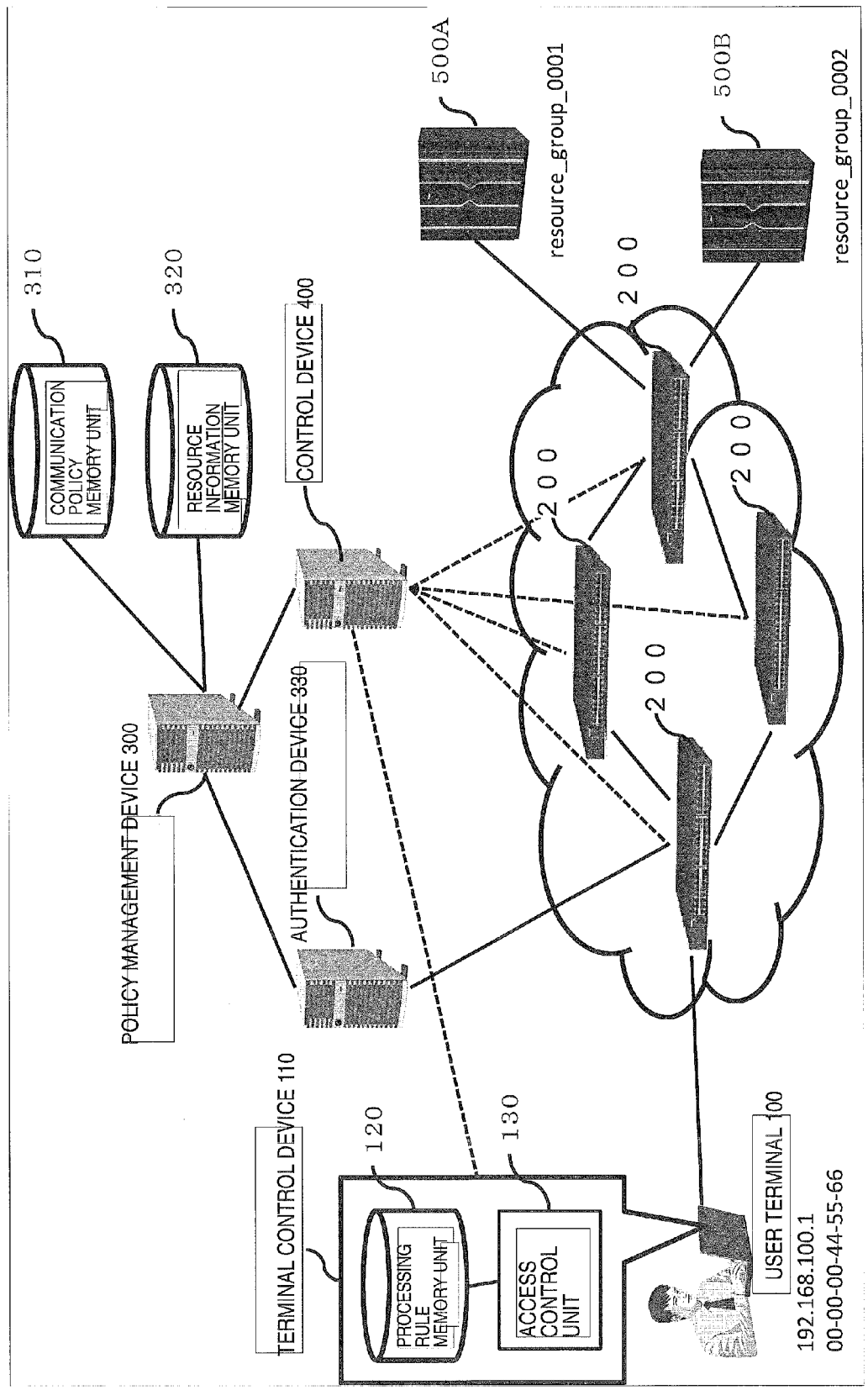
FIG. 7 is a diagram showing an example in which the configuration of FIG. 6 is applied to an access control system.

FIG. 7 is a diagram representing an example in which an access control system is realized using the configuration of FIG. 6. The configuration shown in FIG. 7 is an example of the system, and the present invention is not limited to the system configuration disclosed in FIG. 7. Referring to FIG. 7, the configuration shown includes: a plurality of the forwarding nodes 200, the terminal control device 110 for controlling whether or not to transmit a packet transmitted from the user terminal 100, the control device 400 for setting processing rules in the forwarding nodes 200 and the terminal control device 110, the policy management device 300 for notifying a communication policy to the control device 400, and an authentication device 330 for providing authentication information indicating an authentication result to the policy management device 300.

A forwarding node 200 processes a received packet in accordance with a processing rule that associates a matching rule matching the received packet and processing content to be applied to a packet that matches with the matching rule. For this type of forwarding node 200, an OpenFlow switch as disclosed in Non-Patent Literature 2 may be used. However, the forwarding node 200 is not limited to the OpenFlow switch.

A certain forwarding node 200 among the plurality of forwarding nodes 200 is connected to network resources 500A and 500B. It is to be noted that the network configuration shown in FIG. 7 is an example, and the connection configuration of the forwarding node 200 and the network resources 500A and 500B is not limited to the example of FIG. 7.

The user terminal 100 communicates via the network resources 500A and 500B, via the forwarding nodes 200. In the example of FIG. 7, a description is given in which the network resource 500A and the network resource 500B each belong to different resource groups, and they are respectively given resource group IDs of resource_group_0001 and resource_group_0002.

The authentication device 330 is an authentication server that uses a password or biometric authentication or the like to perform a user authentication procedure with the user terminal 100. The authentication device 330 transmits authentication information indicating a result of the user authentication procedure with the user terminal 100 to the policy management device 300.

FIG. 8 is an example of authentication information held in the authentication device 330 of the present exemplary embodiment. For example, in a case where the authentication of a user having a user ID of user1 succeeds, the authentication device 330 transmits an entry for user1 of attributes such as IP address: 192.168.100.1, and MAC address: 00-00-00-44-55-66, and role IDs: role_0001 and role_0002, as authentication information to the policy management device 300. In the same way, in a case where the authentication of a user having a user ID of user2 succeeds, the authentication device 330 transmits an entry for user2 of the attributes: user2, IP address: 192.168.100.2, and MAC address: 00-00-00-77-88-99, and role ID: role_0002, as authentication information to the policy management device 300.

The authentication information may be information by which the policy management device 300 can determine a communication policy assigned to a user, and there is no limitation to the example of FIG. 8. For example, the authentication information may be the user ID of a user for whom authentication has succeeded, an access ID such as a role ID or MAC address derived from the user ID in question, location information of the user terminal 100, or a combination of these. The authentication device 330 may transmit information of a user for whom authentication has failed, as authentication information to the policy management device 300, and may transmit a communication policy by which the policy management device 300 restricts access from the user in question, to the control device 400.

The policy management device 300 is connected to the communication policy memory unit 310 and a resource information memory unit 320, determines a communication policy corresponding to the authentication information received from the authentication device 330, and transmits the determined communication policy to the control device 400.

FIG. 9 is an example of communication policy information stored in the communication policy memory unit 310. In the example of FIG. 9, the communication policy information has a resource group ID given to a group of resources, and access rights, for each role identified by a role ID. For example, a user having the role ID: role_0001 is allowed access to both resource groups having IDs: resource_group_0001 and resource_group_0002. On the other hand, a user having the role ID: role_0002 is denied access to the resource group ID: resource_group_0001, but is allowed access to resource_group_0002.

FIG. 10 is an example of resource information stored in the resource information memory unit 320. In the example of FIG. 10, the resource information is information associated with a resource ID of a resource belonging to a resource group ID or other detailed attributes thereof (resource attributes). For example, with regard to the resource information, resources having resource_0001, resource_0002, and resource_0003 are included in a group identified by the resource group ID: resource_group_0001, and port numbers used in respective IP addresses, MAC addresses, and services thereof are included.

The policy management device 300 makes reference to the communication policy information and the resource information, determines a communication policy of a user who has received authentication by the authentication device 330, and notifies the control device 400. For example, based on a role ID included in authentication information received from the authentication device 330, the policy management device 300 identifies content of a resource group ID and access rights thereof attached to the role ID in question from the policy information of FIG. 9. The policy management device 300 identifies the resource information belonging to the resource group ID from the resource information of FIG. 10. The policy management device 300 creates a communication policy using the identified policy information and the resource information.

FIG. 11 shows an example of a communication policy of a user having a user ID: user1, created from information shown in FIG. 8, FIG. 9, and FIG. 10. Values of attribute information of the user ID: user1 of the authentication information of FIG. 8 are set in a source field of FIG. 11. Furthermore, resource attributes extracted from resource information of FIG. 10 based on content of the role ID: role_0001 of the policy information of FIG. 9 are set in a destination field. Rights based on access rights of the role ID: role_0001 of the policy information of FIG. 9 are set in an access rights field. In addition, content (for example, service and port number) that has been set in a resource attribute field of the resource information of FIG. 10 is set in a condition (option) field.

On receiving the communication policy, the control device 400 creates a processing rule specifying processing content to transmit to a forwarding node a request to set a processing rule for a packet from the user to whom the communication policy in question is applied, and sets the processing rule in at least one forwarding node among the plurality of forwarding nodes 200. On receiving a packet from the user to whom the communication policy is applied, the forwarding node 200 transmits a request to set a processing rule to the control device 400, based on the processing rule. On receiving the request to set the processing rule for a packet from the user to whom the communication policy is applied, the control device 400 determines a forwarding path of the packet and a processing rule corresponding to the forwarding path, based on packet information included in the setting request, and sets the processing rule in the forwarding node 200 in the forwarding path of the packet in question. With regard to the processing rule set in the forwarding node, the control device 400 transmits a processing rule determining whether or not to forward a packet from the terminal 100, to the terminal control device 110 of the user terminal 100.

Figure 12:
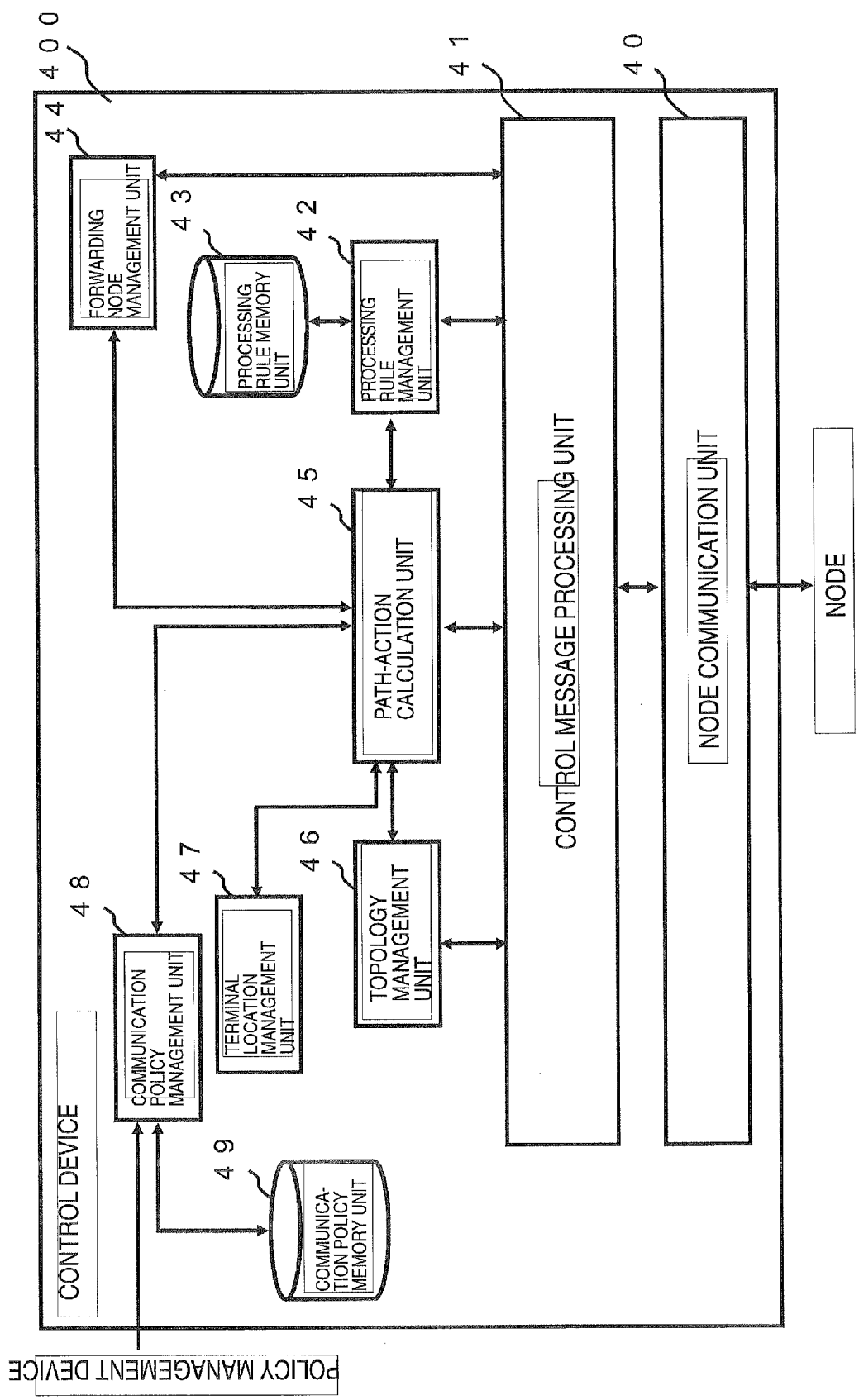
FIG. 12 is a diagram showing an example of a configuration of a control device.

FIG. 12 is a block diagram representing a detailed configuration of the control device 400. The control device 400 is provided with a node communication unit 40 that performs communication with a forwarding node 200, a control message processing unit 41, a processing rule management unit 42, a processing rule memory unit 43, a forwarding node management unit 44, a path-action calculation unit 45, a topology management unit 46, a terminal location management unit 47, a communication policy management unit 48, and a communication policy memory unit 49.

The control message processing unit 41 analyzes a control message received from the forwarding node 200 and delivers the control message information to a corresponding functional block inside the control device 400, in accordance with a result of the analysis.

The processing rule management unit 42 manages how a processing rule is set and in which forwarding node 200. Specifically, a processing rule created by the path-action calculation unit 45 is registered in the processing rule memory unit 43 and set in the forwarding node 200, and updating is performed of registration information of the processing rule memory unit 43 in response to a case where a change occurs in the processing rules set in the forwarding node 200, according to a processing rule deletion notice from the forwarding node 200.

The forwarding node management unit 44 manages the capability (for example, number and type of ports, type of processing content supported, and the like) of the forwarding node 200 controlled by the control device 400.

On receiving a communication policy from the communication policy management unit 48, the path-action calculation unit 45 creates a processing rule to execute a request to set a processing rule with respect to a packet transmitted from a terminal used by the user in question, in accordance with the communication policy concerned. It is to be noted that the forwarding node 200 that is a set destination of the created processing rule may be any of the forwarding nodes 200 to which the user terminal 100 can connect, or may be a selection of any forwarding node 200 based on source information included in the communication policy.

On receiving a request to set a processing rule with respect to a packet transmitted from the terminal used by the user, the path-action calculation unit 45 determines a forwarding path of the packet in question and a processing rule corresponding to the forwarding path in question, based on packet information included in the request.

Furthermore, the path-action calculation unit 45 calculates the packet forwarding path based on network topology information built by the topology management unit 46. It is to be noted that the path-action calculation unit 45 may calculate the forwarding path of the packet giving consideration also to location information of the communication terminal managed by the terminal location management unit 47. Next, the path-action calculation unit 45 acquires port information and the like of the forwarding nodes 200 in the forwarding path from the forwarding node management unit 44, and obtains processing content to be executed by the forwarding nodes 200 in the path, and a matching rule for identifying flow to which the processing content is applied. It is to be noted that the matching rule can be created using the source IP address, the destination address, a condition (option) and the like, of the communication policy of FIG. 11. Accordingly, in a case of the first entry of the communication policy of FIG. 11, with respect to the path-action calculation unit 45, a processing rule is created specifying processing content and the like, for forwarding a packet from a source IP address of 192.168.100.1 to a destination of IP 192.168.0.1, from a prescribed port of the forwarding node 200. It is to be noted that the path-action calculation unit 45, when setting a processing rule, may create not only a packet for which a request is received to set a processing rule, but may also create a processing rule realizing packet forwarding to a resource to which the user terminal has access rights.

The topology management unit 46 builds network topology information based on connection relationships of forwarding nodes 200 collected via the node communication unit 40.

The terminal location management unit 47 manages information for identifying the location of the user terminal connected to the communication system. In the present exemplary embodiment, a description is given in which the IP address is used as information for identifying the user terminal, and a forwarding node identifier of a forwarding node to which the user terminal is connected and information of a port thereof are used as information for identifying the location of the user terminal. However, information for identifying the user terminal and the location of the user terminal is not limited to this. For example, the terminal and its location may be identified by using information provided by the authentication device 330.

On receiving communication policy information from the policy management device 300, the communication policy management unit 48 stores the information in the communication policy memory unit 49, and also transmits the information to the path-action calculation unit 45.

It is to be noted that the OpenFlow controller of Non-Patent Literatures 1 and 2 may be applied as the control device 400. That is, operational functions of a processing rule (flow entry) on the occasion of receiving the communication policy may be added to the OpenFlow controller.

The processing rule determination unit 420 transmits to the processing rule memory unit 120 of the terminal control device 110 a processing rule for determining whether or not to forward a packet, (for example, a processing rule with a source of "192.168.100.1", a destination of "192.168.0.3", and access rights of "deny" in the table of FIG. 11) among processing rules created by the path-action calculation unit 45. A method of forwarding from the control device 400 to the processing rule memory unit 120 of the terminal control device 110 may be by a wired connection, a wireless connection, or any other forwarding method.

Each unit (processing means) of the control device 400 shown in FIG. 12, and the path control unit 410 and the processing rule determination unit 420 can be realized by a computer program that stores the abovementioned respective information and executes the respective processes described above in a computer configuring the control device 400, using hardware thereof.

The terminal control device 110 in FIG. 7 is configured from the processing rule memory unit 120 and the access control unit 130, similar to FIG. 6. The processing rule memory unit 120 receives and stores a processing rule for determining whether or not to forward a packet, from the control device 400. The access control unit 130 executes access control for a packet transmitted from the user terminal 100, in accordance with a processing rule recorded in the processing rule memory unit 120. That is, in a case where denial of access is specified in a processing rule corresponding to a packet transmitted by the user terminal 100, the access control unit 130 restricts transmission of the packet in question.

The processing rule memory unit 120 and the access control unit 130 of the abovementioned terminal control device 110 can be realized by a computer program that stores the abovementioned respective information and executes the respective processes described above in a computer of the user terminal that configures the terminal control device 110, using hardware thereof.

Figure 13:
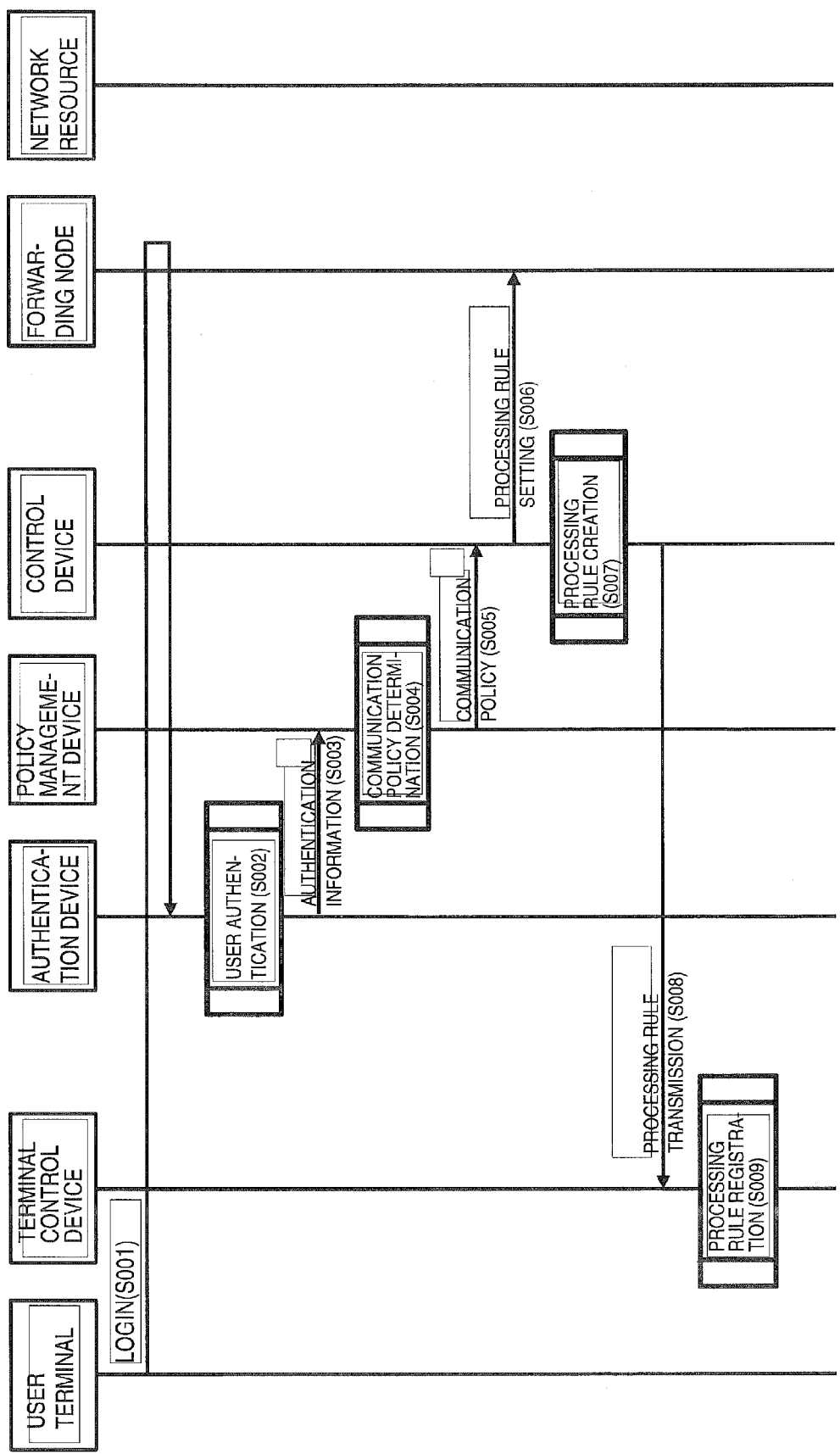
FIG. 13 is a sequence diagram showing an example of operations of the first exemplary embodiment.
Figure 14:
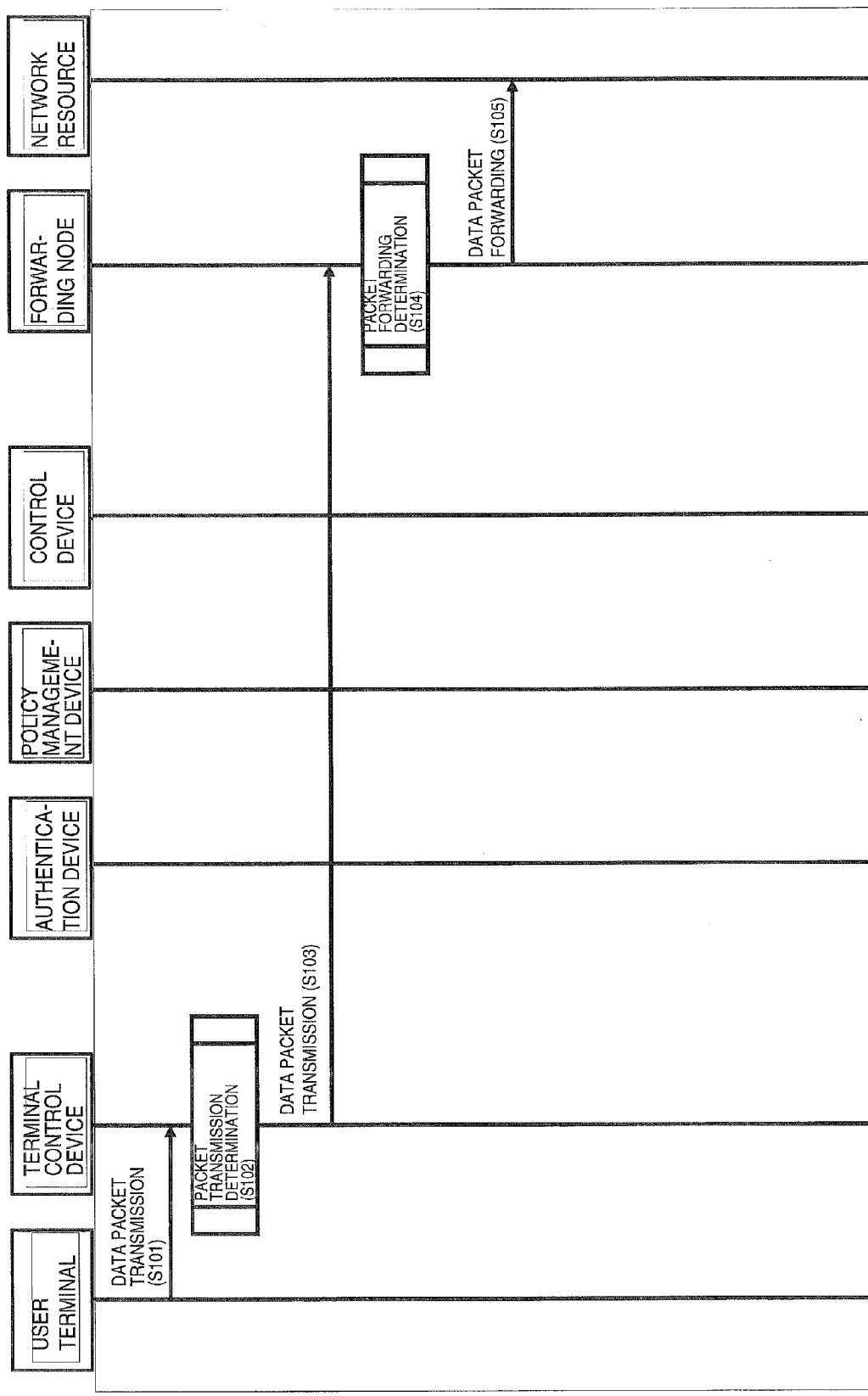
FIG. 14 is a sequence diagram showing an example of operations of the first exemplary embodiment.
Figure 15:
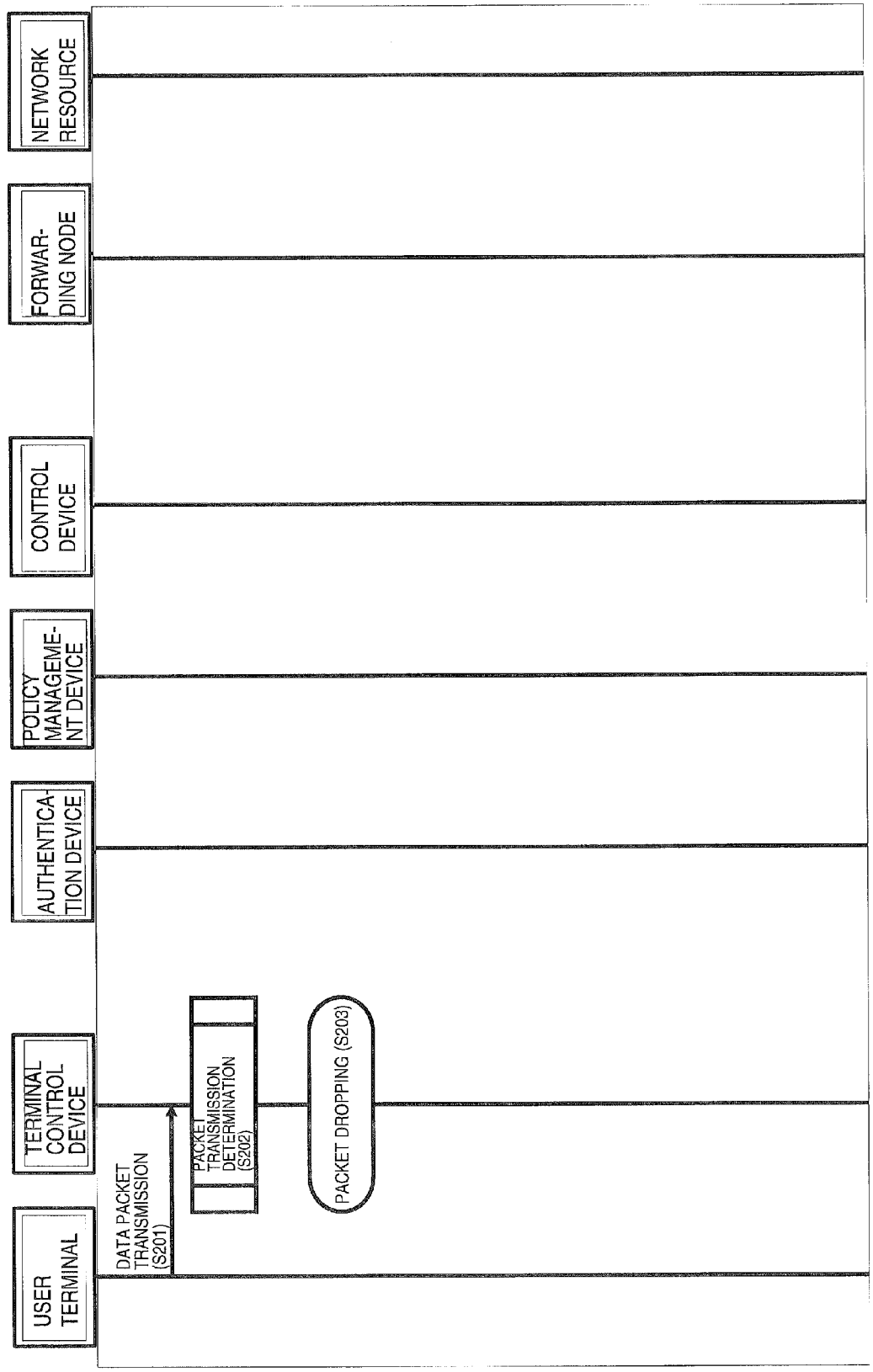
FIG. 15 is a sequence diagram showing an example of operations of the first exemplary embodiment.

Next a detailed description is given concerning operations of the present exemplary embodiment, making reference to the drawings. FIG. 13, FIG. 14, and FIG. 15 are sequence diagrams representing a sequence of operations of the present exemplary embodiment. Referring to FIG. 13, when the user terminal makes a login request to the authentication device 330, a packet corresponding to the login request (access request) is forwarded to the authentication device 330 (S001 in FIG. 13).

The authentication device 330 performs user authentication (S002 in FIG. 13). The authentication device 330 transmits authentication information to the policy management device 300 (S003 in FIG. 13). The policy management device 300 refers to the communication policy memory unit 310 and the resource information memory unit 320, based on the received authentication information, and determines a communication policy (S004 in FIG. 13). The policy management device 300 transmits the determined communication policy to the control device 400 (S005 in FIG. 13).

On receiving the communication policy, the control device 400 sets, in a forwarding node 200, a processing rule specifying processing content in which a request to set a processing rule corresponding to the packet transmitted from the user terminal is transmitted to the control device 400 (S006 in FIG. 13). The control device 400, based on the communication policy, determines whether or not to forward the packet and creates a processing rule corresponding to a result of the determination (S007 in FIG. 13). The control device 400 transmits the created processing rule to the terminal control device 110 (S008 in FIG. 13).

On receiving the processing rule transmitted by the control device 400, the terminal control device 110 registers the processing rule in the processing rule memory unit 120 (S009 in FIG. 13).

A description is given concerning operations in a case where forwarding of the packet from the user terminal is allowed, and a case where transmission of the packet is denied, using FIG. 14 and FIG. 15, respectively.

FIG. 14 is a sequence diagram representing a sequence of operations in a case where transmission of the packet by the terminal control device 110 is allowed. The user terminal transmits the packet with a destination of a network resource (S101 in FIG. 14). The terminal control device 110 receives the packet and determines whether or not to transmit the packet to the network resource (S102 in FIG. 14). The terminal control device 110 compares the destination IP address of the packet transmitted from the user terminal and processing rules registered in the processing rule memory unit 120. In a case where it is specified that access is allowed, in a processing rule corresponding to the packet transmitted from the user terminal, the terminal control device 110 transmits the packet to the forwarding node 200 (S103 in FIG. 14).

The forwarding node 200 receives the packet from the terminal control device 110, determines a forwarding path of the packet in accordance with the processing rule registered by the control device 400 (S104 in FIG. 14), and forwards the packet (S105 in FIG. 14).

FIG. 15 is a sequence diagram representing a sequence of operations in a case where transmission of a packet by the terminal control device 110 is denied. When the user terminal transmits the packet with a destination of a network resource (S201 in FIG. 15), the terminal control device 110 receives the packet and determines whether or not to transmit the packet to the network resource (S202 in FIG. 15). The terminal control device 110 compares the destination IP address of the packet transmitted from the user terminal and processing rules registered in the processing rule memory unit 120. In a case where content is specified showing that access is denied, in a processing rule corresponding to the packet transmitted from the user terminal, the terminal control device 110 restricts transmission of the packet (the packet is dropped or the like) (S203 in FIG. 15).

It is to be noted that the control device 400 may set the processing rule for the terminal, or the terminal may periodically refer to the control device 400 and the terminal may obtain the processing rule. Furthermore, a combination of the two mechanisms is also possible.

The mechanism for allowing or denying forwarding of a packet by the access control unit 130 may be a mechanism similar to a method performed in a forwarding node, or may use packet filtering technology as in iptables. Furthermore, the access control unit 130 of the terminal control device 110 can also apply a processing rule allowing or denying forwarding of a packet with respect to a physical NIC (Network Interface Card) inside the user terminal; application is also possible to respective virtual NICs held by plural VMs (Virtual Machines) operating inside the user terminal; and application is also possible to a plurality of virtual switches operating inside the user terminal. In this way, the access control unit 130 can freely specify a place for executing access control inside the user terminal.

As described above, the packet transmitted from the user terminal can be subjected to access restriction inside the user terminal, without being transmitted to the forwarding node 200, by the terminal control device 110 inside the user terminal. Therefore, the load on a control device accompanying a request to set a processing rule and the load of forwarding processing of a forwarding node can be greatly reduced.

Second Exemplary Embodiment

Next, a description is given concerning a second exemplary embodiment of the present invention, in which a modification is added to operations of the policy management device of the first exemplary embodiment described above. Since the present exemplary embodiment can be implemented by a configuration equivalent to the first exemplary embodiment described above, a description is given below centered on points of difference in operation thereof.

Figure 16:
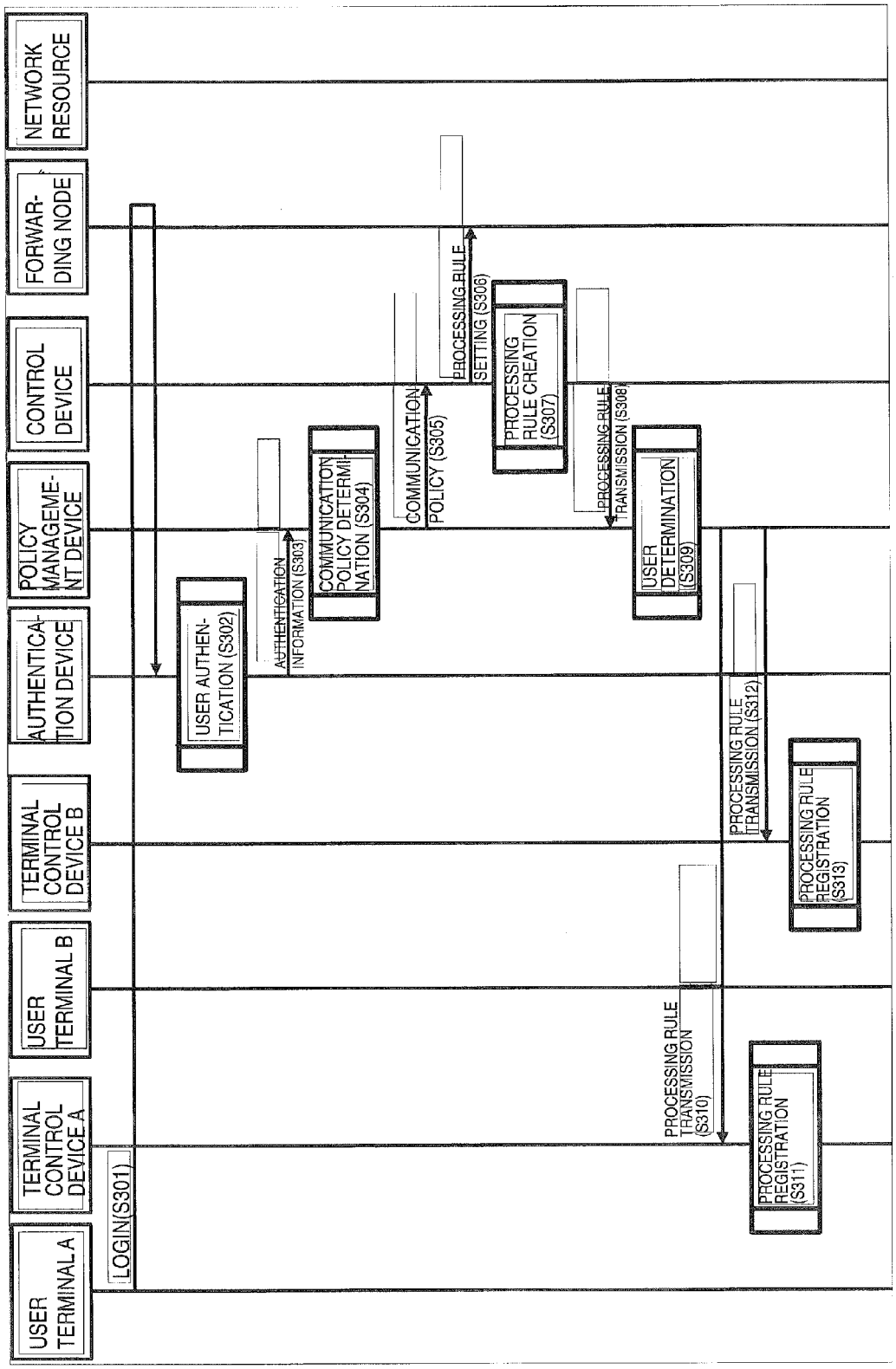
FIG. 16 is a sequence diagram showing an example of operations of a second exemplary embodiment.

FIG. 16 is a sequence diagram representing a sequence of operations of the second exemplary embodiment of the present invention. A user terminal makes a login request to an authentication device 330 (S301 in FIG. 16). The authentication device 330 performs user authentication (S302 in FIG. 16). The authentication device 330 transmits authentication information to a policy management device 300 based on a result of user authentication (S303 in FIG. 16).

A policy management device 300 determines a communication policy for a user based on the authentication information received from the authentication device 330 (S304 of FIG. 16). The policy management device 300 transmits the determined communication policy to the control device 400 (S305 in FIG. 16).

The control device 400 generates a processing rule based on the communication policy received from the policy management device 300, and sets the processing rule in a forwarding node 200 (S306 in FIG. 16). These operations are the same as the first exemplary embodiment. In the present exemplary embodiment, after the control device 400 has set the processing rule in the forwarding node 200, reference is made to content of the processing rule, and the processing rule for determining whether or not to forward a packet is transmitted to the policy management device 300 (S307 in FIG. 16).

The policy management device 300 that has received the processing rule for determining whether or not to forward a packet uses information of a communication policy memory unit 310 and a resource information memory unit 320 to select another user for whom the processing rule is to be applied (S309 in FIG. 16).

FIG. 17 is a diagram representing an example in which the policy management device 300, which has received the processing rule for determining whether or not to forward a packet, selects another user for whom the processing rule is to be applied. For example, referring to FIG. 17, there is a processing rule (below, a processing rule (a)) that denies access where a source is "IP: 192.168.100.0/24" and a destination is "192.168.0.3". In this case, the policy management device 300 searches for another user (resource ID or resource group ID) matching the processing rule (a), and selects another user who matches (for example, with a source of "192.168.100.10", and other conditions having the same resource ID and resource group ID as for the user of the processing rule (a)). In the description below, a user who performs login processing (S301) of FIG. 16 is A, a user terminal used by user A is a user terminal A, and a terminal control device possessed by the user terminal A is terminal control device A. Furthermore, a user selected based on a processing rule received from the control device 400 by the policy management device 300 of FIG. 16 is B, a user terminal used by user B is a user terminal B, and a terminal control device possessed by the user terminal B is terminal control device B.

The policy management device 300 receives the processing rule (a) for determining whether or not to forward a packet to user A from the control device 400, and after selecting user B who matches the processing rule (a), sets respective processing rules in the terminal control device A of the user terminal A, and the terminal control device B of the user terminal B (S310 and S312 of FIG. 16). It is to be noted that any order may be used as the order in which the control device 400 transmits the processing rules to the terminal control device A and the terminal control device B.

On receiving the processing rule transmitted by the control device 400, the terminal control device A registers the processing rule in a processing rule memory unit of the terminal control device A (S311 in FIG. 16). Similarly, on receiving the processing rule transmitted by the control device 400, the terminal control device B registers the processing rule in a processing rule memory unit of the terminal control device B (S313 in FIG. 16).

Thereafter, operations in a case where packet transmission from the user terminal A and the user terminal B is allowed, and in a case where packet transmission is denied, are similar to the first exemplary embodiment described using FIG. 14 and FIG. 15.

As a result of the above sequence of operations, in a case where a processing rule set for a certain user's terminal is also applicable to another user, by registering the processing rule in advance in the terminal control device of the other user also, it is possible to reduce the load of the control device accompanying the request to set a processing rule and the load of forwarding processing of a forwarding node.

Third Exemplary Embodiment

Figure 18:
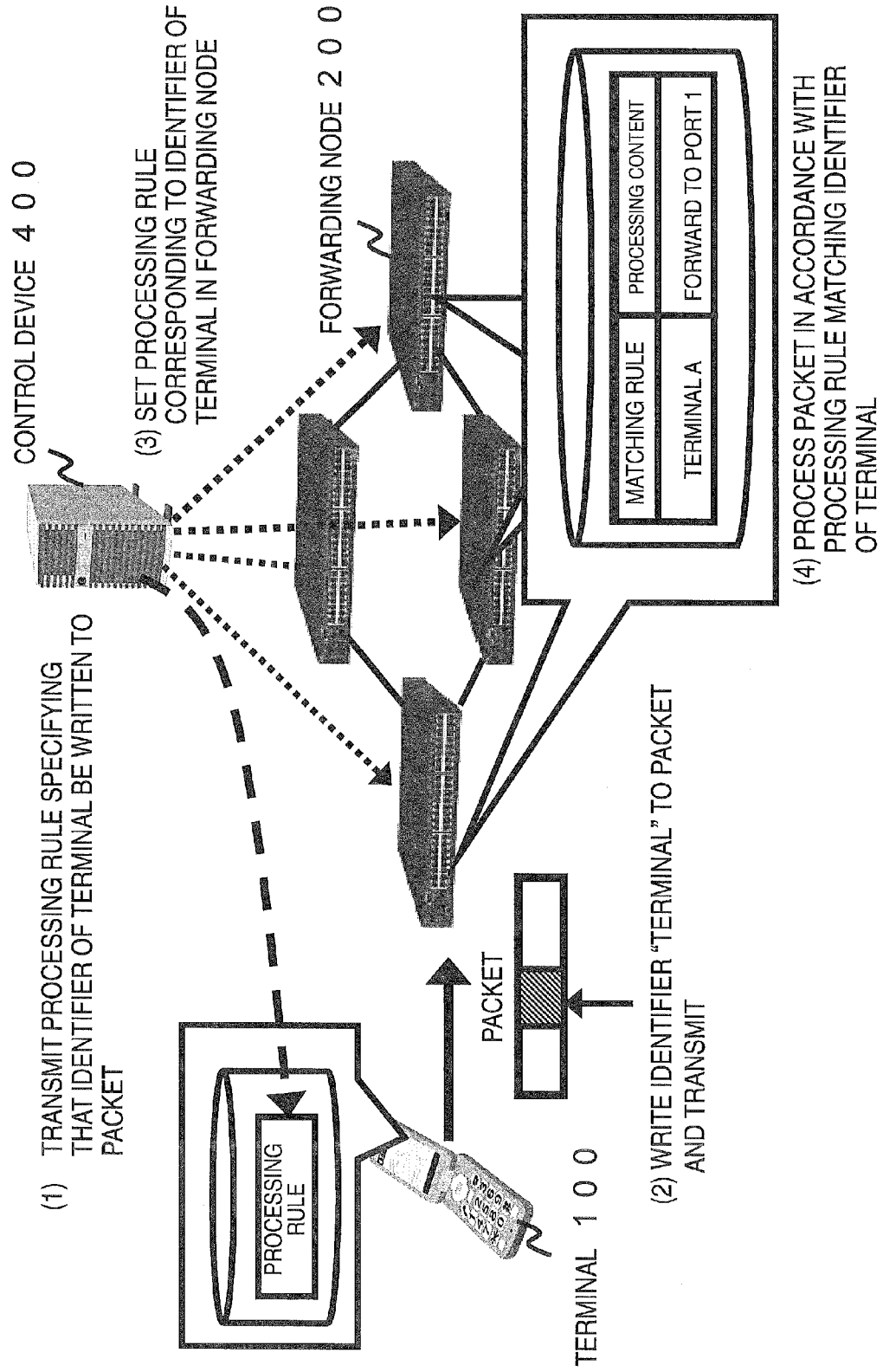
FIG. 18 is a diagram showing an example of a configuration of a third exemplary embodiment.

Next, a description is given of a third exemplary embodiment of the present invention, making reference to FIG. 18. Where respective elements in FIG. 18 have the same reference numbers as elements in other exemplary embodiments, the elements are the same as content described in the other exemplary embodiments. Below, in the present exemplary embodiment, a detailed configurational description is omitted.

A control device 400 sets a processing rule specifying writing of an identifier of a terminal to a packet, with respect to a terminal 100. It is to be noted that occasions at which the processing rule is set for the terminal 100 by the control device 400 may be arbitrary. For example, in a case where the control device 400 receives a packet (for example, an authentication packet or a login packet) for requesting access, transmitted by the terminal 100, a processing rule may be set for the terminal 100. Furthermore, the control device 400 may set a processing rule for the terminal 100 at arbitrary timing.

The control device 400 includes in the processing rule a matching rule for matching a packet that is a target of processing to write the identifier of the terminal, and sets the processing rule in the terminal 100.

The terminal 100 writes the identifier in the terminal in an arbitrary field of the packet (for example, a prescribed field of a header), in accordance with the set processing rule. The terminal 100 transmits the packet in which the identifier is written to a network composed of forwarding nodes 200.

A forwarding node 200 receives the packet including the identifier of the terminal from the terminal 100, and checks whether or not there is a processing rule corresponding to the identifier of the terminal, from processing rules it holds. In a case where there is no processing rule corresponding to the identifier of the terminal, the forwarding node 200 transmits a request to set a processing rule corresponding to the identifier of the terminal, to the control device 400.

The control device 400 that receives the request from the forwarding node 200 determines a forwarding path corresponding to the identifier of the terminal, and transmits a processing rule corresponding to the forwarding path to the forwarding node 200. In the processing rule set in the forwarding node 200, the identifier of the terminal is set in a matching rule, and processing of a packet corresponding to the identifier is set in processing content. After the processing rule has been set, the forwarding node 200 processes the packet that includes the identifier of the terminal, in accordance with a processing rule matching the identifier of the terminal included in the packet.

According to the present exemplary embodiment, the control device 400 can flexibly control packet flow in terminal units. Furthermore, since there is no necessity for the control device 400 or the forwarding node 200 to recognize the identifier of the terminal, the processing load necessary for collecting terminal identifiers by the control device 400 and the forwarding node 200 is greatly reduced. In addition, since the processing device 400 can set a processing rule that corresponds to an identifier of a terminal in advance in the forwarding node 200, it is possible to curtail requests to the control device 400 generated due to the processing rule not being set in the forwarding node 200. Therefore, the processing load on the control device 400 is greatly reduced.

Fourth Exemplary Embodiment

Figure 19:
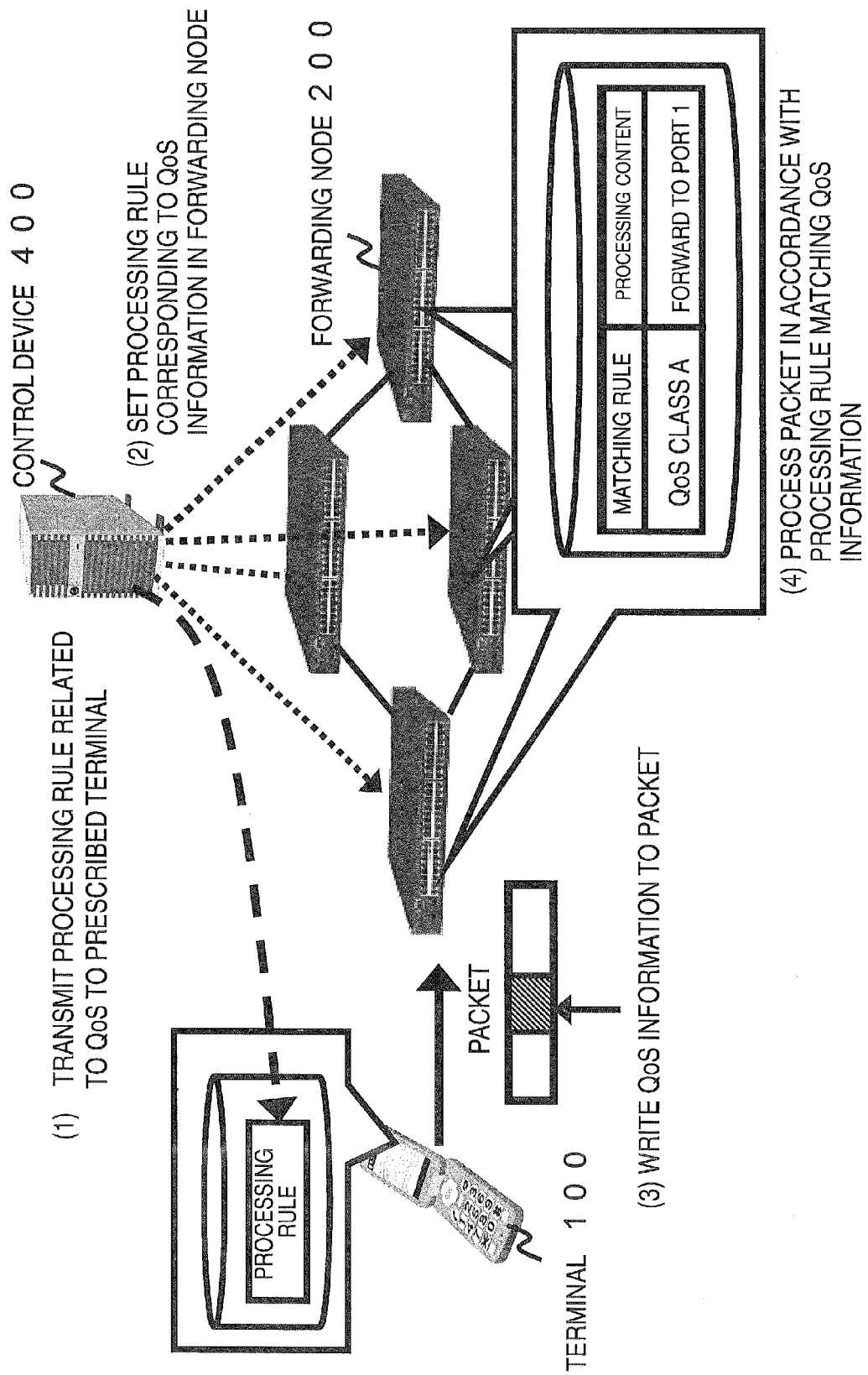
FIG. 19 is a diagram showing an example of a configuration of a fourth exemplary embodiment.

Next, a description is given of a fourth exemplary embodiment of the present invention, making reference to FIG. 19. Where respective elements in FIG. 19 have the same reference numbers as elements in other exemplary embodiments, the elements are the same as content described in the other exemplary embodiments. Below, in the present exemplary embodiment, a detailed configurational description is omitted.

A control device 400 sets a processing rule concerning QoS with regard to a prescribed terminal 100. It is to be noted that occasions at which a processing rule is set for the terminal 100 by the control device 400 may be arbitrary. For example, in a case where the control device 400 receives a packet (for example, an authentication packet or a login packet) for requesting access, transmitted by the terminal 100, a processing rule may be set for the terminal 100. Furthermore, the control device 400 may set a processing rule for the terminal 100 at arbitrary timing. In addition, the control device 400 may transmit QoS information to only a prescribed terminal 100 selected by a prescribed condition.

The processing rule concerning QoS, for example, specifies processing for writing QoS information of a packet to the packet that has been transmitted from the prescribed terminal 100. It is to be noted that the QoS information is, for example, a QoS class in which class division is done according to a priority. The control device 400 controls a forwarding node 200 so as to accommodate a band, with regard to a packet with a high QoS class. Furthermore, the control device 400 may set a processing rule specifying writing of a low QoS class to a packet, for the terminal 100, and may control the forwarding node 200 so as to temporarily isolate traffic from a heavy user with high frequency of communication, in a path with a narrow band. The control device 400 may determine the processing rule set in the terminal 100 based on communication records or location information of the terminal 100.

The control device 400 includes in the processing rule a matching rule for matching a packet that is a target for processing to write the QoS information, and sets the processing rule in the terminal 100.

The terminal 100 writes the QoS information in an arbitrary field of the packet (for example, a prescribed field of a header), in accordance with the set processing rule. The terminal 100 transmits the packet in which the QoS information is written to a network composed of forwarding nodes 200.

A forwarding node 200 receives the packet including the QoS information from the terminal 100, and checks whether or not there is a processing rule corresponding to the QoS information, from processing rules it holds. In a case where there is no processing rule corresponding to the QoS information, the forwarding node 200 transmits a request to set a processing rule corresponding to the QoS information included in the packet to the control device 400. However, the control device 400 may set a processing rule corresponding to the QoS information in advance in the forwarding node 200. In this case, requests to set a processing rule with respect to the control device 400 are greatly reduced.

The control device 400 that receives the request from the forwarding node 200 determines a forwarding path corresponding to the QoS information, and transmits a processing rule corresponding to the forwarding path to the forwarding node 200. In the processing rule set in the forwarding node 200, the QoS information is set in a matching rule, and processing of a packet corresponding to the QoS information is set as processing content. After the processing rule has been set, the forwarding node 200 processes the packet that includes the QoS information in accordance with a processing rule matching the QoS information included in the packet.

According to the present exemplary embodiment, it is possible to execute QoS control for a terminal by the initiative of a network operator who administers the control device 400. Furthermore, since the control device 400 can set a processing rule corresponding to the QoS information in advance in the forwarding node 200, it is possible to greatly reduce requests to set processing rules from the forwarding nodes 200. Therefore, the processing load on the control device 400 is greatly reduced. Furthermore, since there is no necessity to execute processing to write the QoS information in the forwarding nodes 200, it is possible to greatly reduce the load of packet processing with regard to the forwarding nodes 200.

Fifth Exemplary Embodiment

Figure 20:
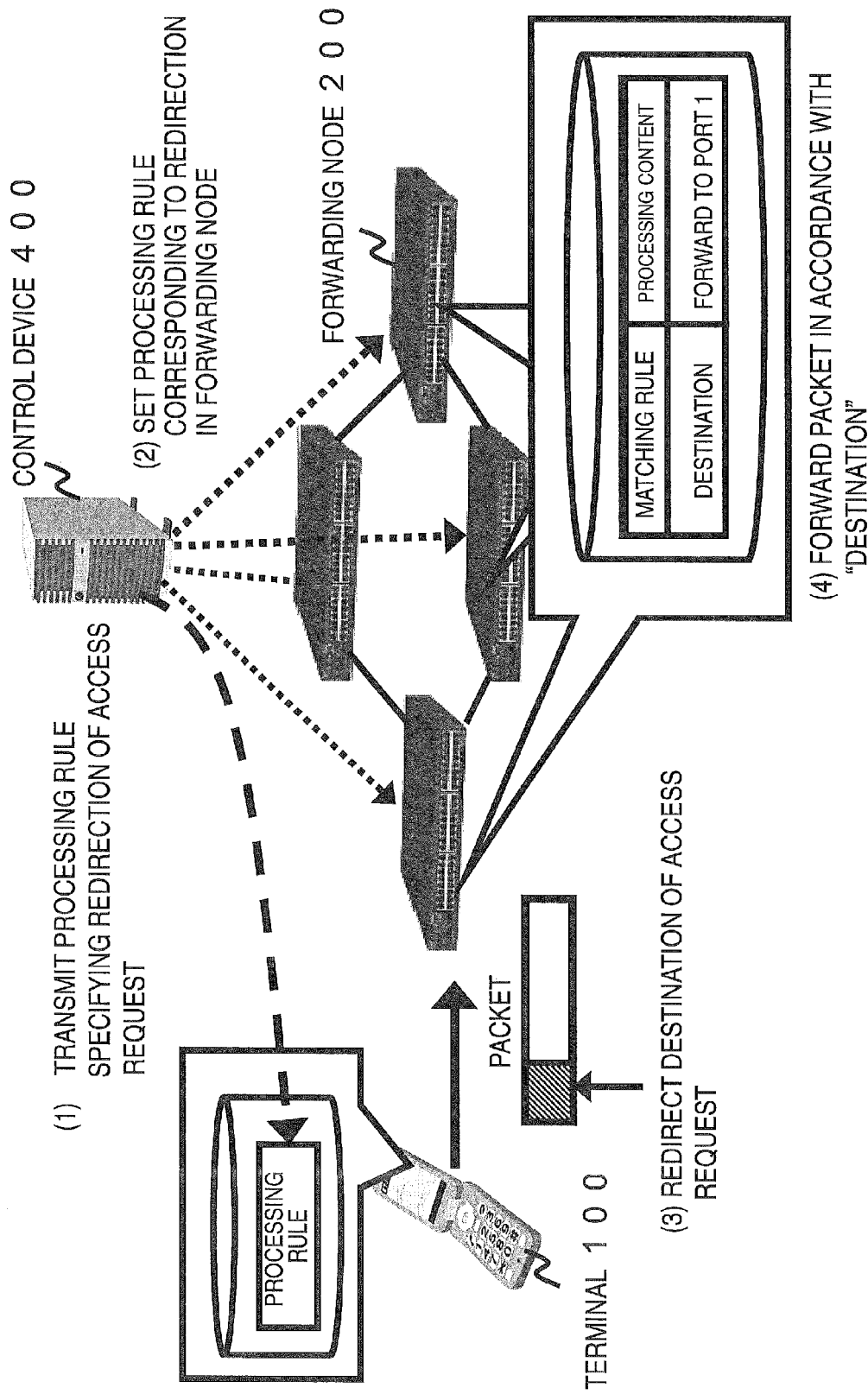
FIG. 20 is a diagram showing an example of a configuration of a fifth exemplary embodiment.

Next, a description is given of a fifth exemplary embodiment of the present invention, making reference to FIG. 20. Where respective elements in FIG. 20 have the same reference numbers as elements in other exemplary embodiments, the elements are the same as content described in the other exemplary embodiments. Below, in the present exemplary embodiment, a detailed configurational description is omitted.

A control device 400 sets a processing rule for a prescribed terminal 100, specifying redirection of an access request of the terminal 100. In a case where it is desired to lead a user of the terminal 100 to a specific advertizing site for example, the control device 400 sets a processing rule specifying redirection of the access request. For example, in a case where the terminal 100 requests access to a certain site carrying out e-commerce, the control device 400 sets a processing rule for the terminal 100 so as to redirect the access request to a related site carrying out a special event such as a discount or the like. It is to be noted that the control device 400 may set a processing rule for the terminal 100, so as make a redirection only for the first access request of the terminal 100. The control device 400 may add a period of validity to the processing rule redirecting communication in the terminal 100, and set the processing rule in the terminal 100. Furthermore, the control device 400 may refer to a communication record of the terminal 100 to determine a redirection destination. For example, the control device 400 may analyze user preferences based on a communication record, and may set a processing rule for the terminal 100, redirecting to an advertizing site or the like, corresponding to the preferences. Furthermore, the control device 400 may determine a redirection destination based on the location of the terminal 100. The control device 400 recognizes the location of the terminal 100 based on location information (GPS or the like) transmitted from the terminal 100, for example, or location information of an access point at which the terminal 100 accesses a network. The control device 400 sets a processing rule specifying redirection to a destination of a prescribed website or the like related to the location, based on the location of the terminal 100.

The control device 400, for example, transmits to the terminal 100 a processing rule executing rewriting of a "destination" field of a header of an access request packet transmitted from the terminal 100. Furthermore, the control device 400 determines a forwarding path corresponding to the redirection destination, and sets a processing rule corresponding to the determined path in a forwarding node 200. The control device 400 may set a processing rule corresponding to the redirection destination in advance in the forwarding node 200. In this case, requests to set processing rules with respect to the control device 400 are greatly reduced.

The control device 400 includes, in the processing rule, a matching rule for matching a packet that is a target for redirection, and sets the processing rule in the terminal 100.

The terminal 100 rewrites the destination field of a packet header in accordance with the processing rule that has been set, to a redirection destination set in the processing rule. The terminal 100 transmits the packet in which the destination field has been rewritten to a network composed of forwarding nodes 200.

The forwarding nodes 200 forward the packet in accordance with a processing rule corresponding to the redirection destination.

According to the present exemplary embodiment, by using the control device 400, a service provider in the network can lead the user of a terminal to a specific site. Furthermore, since the control device 400 can set a processing rule corresponding to a redirected destination in advance in the forwarding nodes 200, it is possible to greatly reduce requests to set processing rules from the forwarding nodes 200. Therefore, the processing load on the control device 400 is greatly reduced. In addition, since there is no necessity to execute processing to rewrite the packet destination in the forwarding nodes 200, packet processing with regard to the forwarding nodes 200 is greatly reduced.

Sixth Exemplary Embodiment

Figure 21:
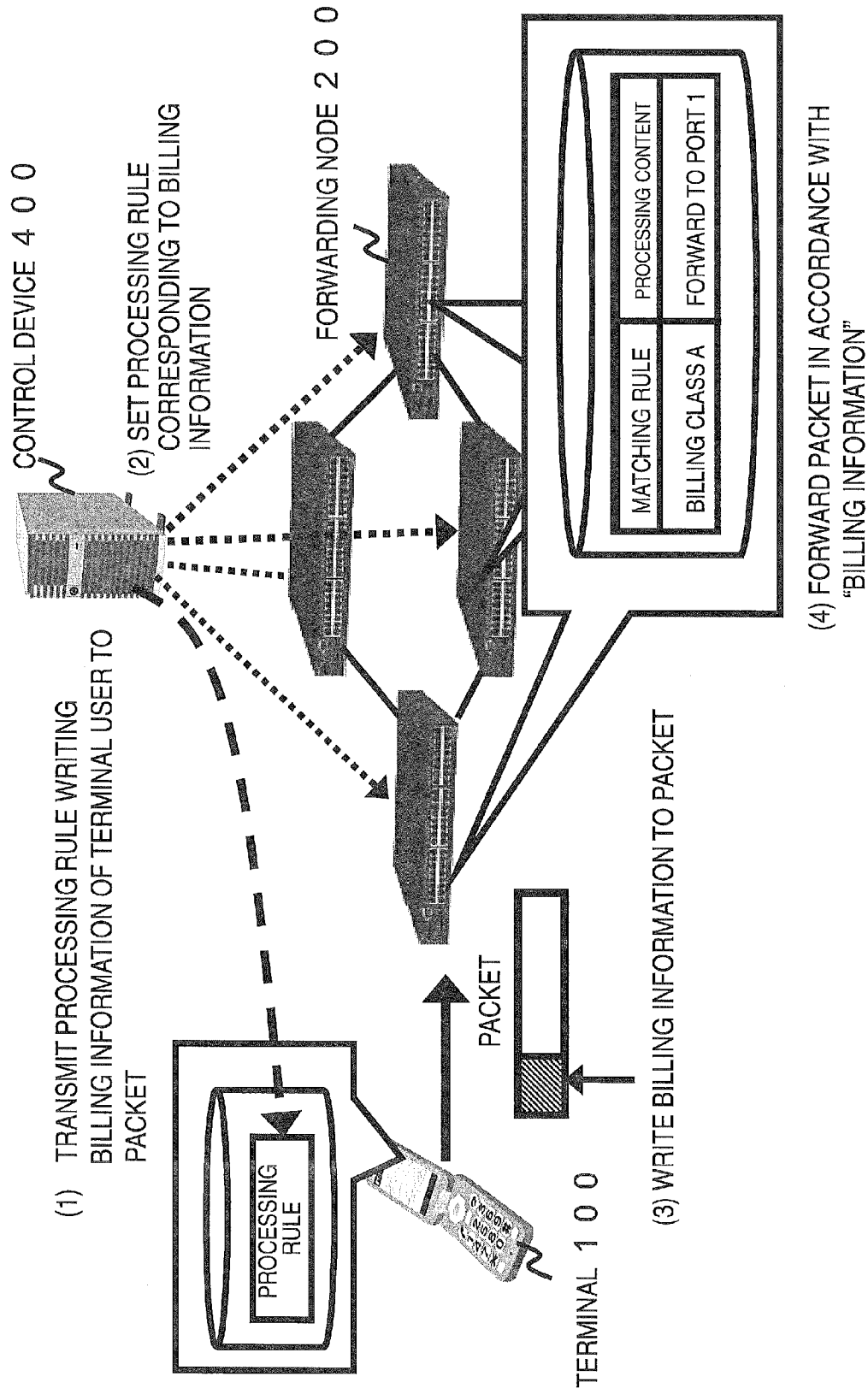
FIG. 21 is a diagram showing an example of a configuration of a sixth exemplary embodiment.

Next, a description is given of a sixth exemplary embodiment of the present invention, making reference to FIG. 21. Where respective elements in FIG. 21 have the same reference numbers as elements in other exemplary embodiments, the elements are the same as content described in the other exemplary embodiments. Below, in the present exemplary embodiment, a detailed configurational description is omitted.

A control device 400 sets a processing rule specifying writing of billing information for a terminal user to a packet, with respect to a prescribed terminal 100. The billing information, for example, relates to a billing class whereby the terminal user makes a contract with a network operator in accordance with quality of communication service and the like. It is to be noted that occasions at which a processing rule is set for the terminal 100 by the control device 400 may be arbitrary. For example, in a case where the control device 400 receives a packet (for example, an authentication packet or a login packet) for requesting access, transmitted by the terminal 100, a processing rule may be set for the terminal 100. Furthermore, the control device 400 may set a processing rule for the terminal 100 at arbitrary timing.

The control device 400 includes, in the processing rule, a matching rule for matching a packet that is a target for processing to write the billing information, and sets the processing rule in the terminal 100.

The control device 400 controls forwarding nodes 200 so as to provide, for packets of a high billing class, a higher service quality (giving priority to range, or the like) than packets in a low billing class.

The terminal 100 writes the billing information in an arbitrary field of the packet (for example, a prescribed field of a header), in accordance with the set processing rule. The terminal 100 transmits the packet in which the billing information is written to a network composed of the forwarding nodes 200.

A forwarding node 200 receives the packet including the billing information from the terminal 100 and checks whether or not there is a processing rule corresponding to the billing information, from processing rules it holds. In a case where there is no processing rule corresponding to the billing information, the forwarding node 200 transmits a request to set a processing rule corresponding to the billing information included in the packet to the control device 400. However, the control device 400 may set a processing rule corresponding to the billing information in advance in the forwarding node 200. In this case, requests to set a processing rule with respect to the control device 400 are greatly reduced.

The control device 400 that receives the request from the forwarding node 200 determines a forwarding path corresponding to the billing information and transmits a processing rule corresponding to the forwarding path to the forwarding node 200. In the processing rule set in the forwarding node 200, the billing information is set in a matching rule, and processing of a packet corresponding to the billing information is set as processing content. After the processing rule has been set, the forwarding node 200 processes the packet that includes the billing information in accordance with a processing rule matching the billing information included in the packet.

It is to be noted that a combination of the present exemplary embodiment and the fifth exemplary embodiment is also possible. The control device 400 may set a processing rule specifying redirection to a site recommending an upgrade of the billing class, to a user terminal 100 for which the billing class is low and which is in a state with communication service quality below a prescribed threshold which continues for a fixed period.

According to the present exemplary embodiment, it is possible to control the communication service quality in accordance with billing information of a terminal user by the initiative of a network operator who administers the control device 400. Furthermore, since the control device 400 can set a processing rule corresponding to the billing information in advance in the forwarding node 200, it is possible to greatly reduce requests to set processing rules from the forwarding nodes 200. Therefore, the processing load on the control device 400 is greatly reduced. Furthermore, since there is no necessity to execute processing to write the billing information in the forwarding nodes 200, it is possible to greatly reduce the load of packet processing with regard to the forwarding nodes 200.

Seventh Exemplary Embodiment

Figure 22:
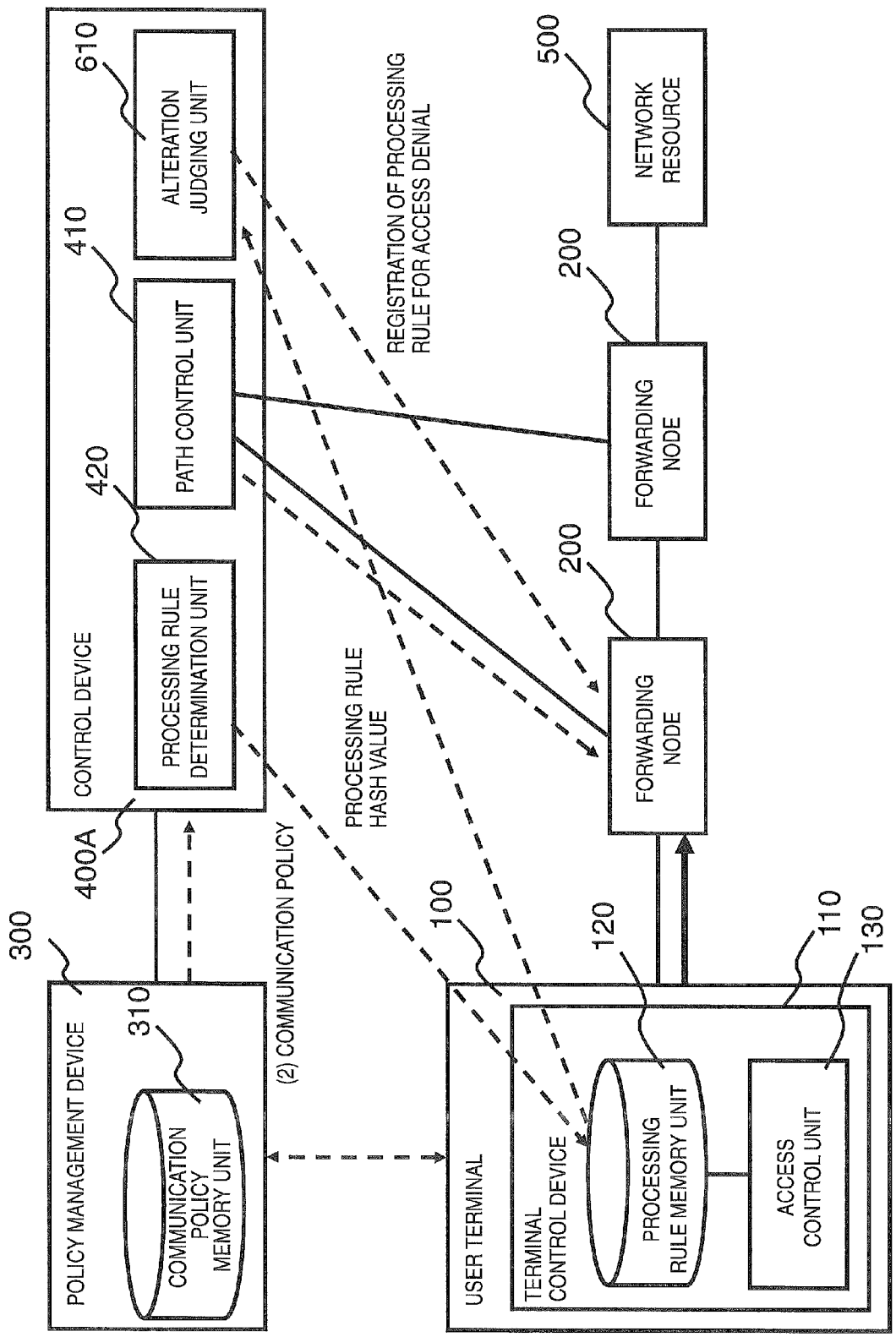
FIG. 22 is a diagram showing an example of a configuration of a seventh exemplary embodiment.

Next, a description is given concerning a seventh exemplary embodiment. FIG. 22 is a diagram representing an example of a configuration of the seventh exemplary embodiment of the present invention. The seventh exemplary embodiment differs from the exemplary embodiments described above in that a control device 400A includes an alteration judging unit 610. The alteration judging unit 610 holds a hash value of a processing rule set in a terminal 100, determined by a processing rule determination unit 420.

The alteration judging unit 610 compares the hash value of a processing rule recorded in a processing rule memory unit 120 of a terminal control device 110, and a hash value that it itself holds. In a case where the hash values are different, the alteration judging unit 610 judges that the processing rule set in the terminal 100 has been altered. In order to ensure the security of a communication system, the alteration judging unit 610 registers a processing rule denying access from that terminal 100, in forwarding nodes 200. It is to be noted that, when setting the processing rule denying access in the forwarding nodes 200, the alteration judging unit 610 may set a period of validity in the processing rule.

Next, a description is given concerning operation of the seventh exemplary embodiment. A description concerning operations that are the same as the exemplary embodiment described above is omitted. Below, a description is given centered on points of difference in operations.

Figure 23:
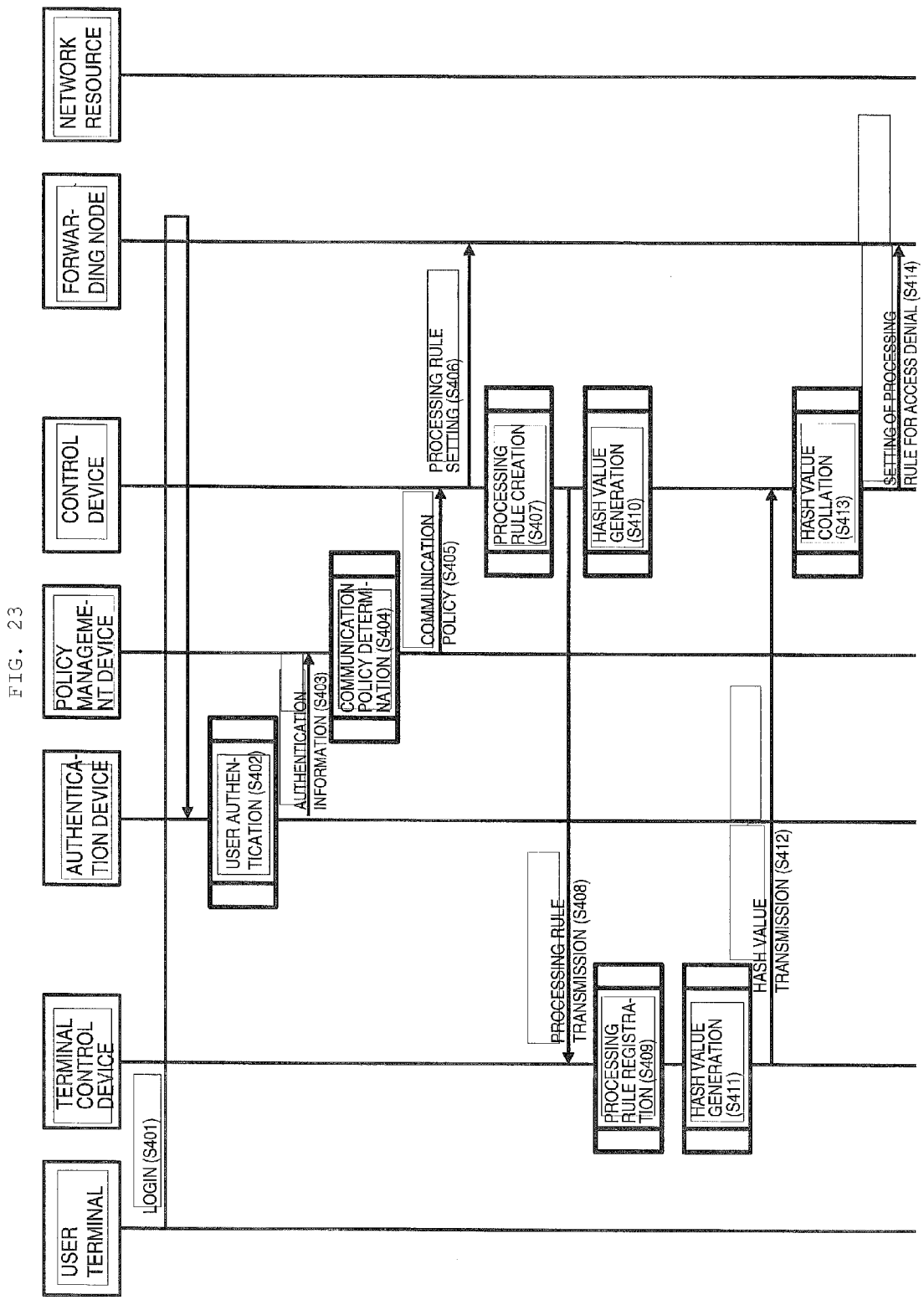
FIG. 23 is a sequence diagram showing an example of operations of the seventh exemplary embodiment.

FIG. 23 is a sequence diagram representing a sequence of operations of the seventh exemplary embodiment of the present invention. A user terminal makes a login request (access request) to an authentication device 330 (S401 in FIG. 23). The authentication device 330 performs user authentication (S402 in FIG. 23). The authentication device 330 transmits authentication information to a policy management device 300 based on a result of user authentication (S403 in FIG. 23).

The policy management device 300 determines a communication policy for a user based on the authentication information received from the authentication device 330 (S404 of FIG. 23). The policy management device 300 transmits the determined communication policy to the control device 400 (S405 in FIG. 23).

The control device 400 determines a processing rule based on the communication policy received from the policy management device 300, and sets the processing rule in a forwarding node 200. On receiving the communication policy, the control device 400 sets a processing rule to perform a request to set a processing rule concerning a packet from a user terminal, in the forwarding node 200 (S406 in FIG. 23). The control device 400 determines a processing rule for setting in the terminal 100 (S407 in FIG. 23). The control device 400 transmits the determined processing rule to the terminal control device 110 (S408 in FIG. 23).

On receiving the processing rule transmitted by the control device 400, the terminal control device 110 registers the processing rule in the processing rule memory unit 120 (S409 in FIG. 23).

The alteration judging unit 610 of the control device 400 generates a hash value requested by a set processing rule with respect to the terminal 100 (S410 in FIG. 23).

The terminal control device 110 generates a hash value requested by the processing rule set by the control device 400 (S411 in FIG. 23), and transmits the hash value to the alteration judging unit 610 of the control device 400 (S412 in FIG. 23).

The alteration judging unit 610 of the control device 400 collates the hash value generated by the alteration judging unit 610 and the hash value transmitted by the terminal control device 110 (S413 in FIG. 23). If the result of the collation of the hash values is that the values match, the alteration judging unit 610 of the control device 400 regards this as normal, and completes the sequence of processes. On the other hand, if the result of the collation of the hash values is that the values are different, a determination is made that a processing rule has been altered by the user of the terminal 100, a processing rule denying access from that terminal 100 is generated, and the processing rule is set in the forwarding node 200 (S414 in FIG. 23). It is to be noted that the alteration judging unit 610 may set a period of validity in the processing rule denying access from the terminal 100.

As a result of the above sequence of operations, in a case where a certain user has altered a processing rule held in the user terminal, the control device detects the alteration, and by setting a processing rule denying all access by that user in forwarding nodes, it is possible to prevent the access control system in question from being intentionally controlled by the user.

Descriptions of respective exemplary embodiments of the present invention have been given above, but the present invention is not limited to the abovementioned exemplary embodiments, and it is possible to add further modifications, substitutions, and adjustments within a scope that does not depart from fundamental technological concepts of the invention. For example, in the respective exemplary embodiments described above, a description has been given in which the control device 400, the authentication device 330, the policy management device 300, the communication policy memory unit 310, and the resource information memory unit 320 are each provided independently, but it is also possible to employ a configuration in which these are integrated as appropriate.

Furthermore, in the above exemplary embodiments a description has been given where access control is performed by assigning a role ID to a user, as shown in FIG. 8 to FIG. 11, but it is also possible to perform access control by using an access ID such as a MAC address, or a user ID assigned to each user, or location information of the user terminal 100, or the like.

In addition, in the abovementioned exemplary embodiments a description has been given in which the user terminal 100 performs an authentication procedure with the authentication device 330 via a forwarding node 200, but it is also possible to employ a configuration in which the user terminal 100 communicates directly with the authentication device 330 and implements the authentication procedure.

In the following, preferred modes are summarized.

[Mode 1]

A terminal, communicating via a network including at least one forwarding device for forwarding a packet, and a control device for controlling said forwarding device(s) in accordance with a request from said forwarding device, said terminal being characterized by comprising: a communication unit that receives a processing rule specifying a process of adding, to a packet, quality information related to communication quality with respect to said terminal, from said control device;

a memory unit that stores said received processing rule; and processing unit that in a case of communicating via said network, adds quality information to a packet in accordance with a processing rule that corresponds to said packet by referring to said processing rule stored in said memory unit.

[Mode 2]

The terminal according to mode 1, characterized in that said communication unit receives a processing rule determined by said control device based on a prescribed condition.

[Mode 3]

The terminal according to mode 1, characterized in that said communication unit receives a processing rule determined by said control device based on a policy corresponding to a user of the terminal itself.

[Mode 4]

The terminal according to mode 1, characterized in that said communication unit receives a processing rule determined by said control device based on a communication record of the terminal itself.

[Mode 5]
The terminal according to mode 1 characterized in that said communication unit receives a processing rule determined by said control device based on information related to a location of the terminal itself.

[Mode 6]
The terminal according to any one of modes 1 to 5, characterized in that said communication unit further comprises a request transmission function that transmits an access request to said network, wherein
said communication unit receives a processing rule determined by said control device in accordance with said access request.

[Mode 7]
The terminal according to any one of modes 1 to 6, characterized in that said communication unit further comprises a request transmission function that transmits an access request to said network, wherein
said communication unit receives a processing rule determined by said control device in accordance with said access request transmitted via said forwarding device.

[Mode 8]
The terminal according to any one of modes 1 to 7, characterized in that said communication unit receives from said control device a second processing rule corresponding to a first processing rule set by said control device with respect to said forwarding device.

[Mode 9]
The terminal according to any one of modes 1 to 8, characterized in that said processing unit collates information included in a packet and a processing rule stored in said memory unit, and processes said packet in accordance with a processing rule corresponding to information included in said packet.

[Mode 10]
The terminal according to any one of modes 1 to 9, characterized in that said processing unit generates first information requested by a processing rule stored in said memory unit, and transmits said first information to said network so that at least one of either said control device or said forwarding device collates said first information and second information requested by said processing rule determined by said control device.

[Mode 11]
The terminal according to any one of modes 1 to 10, characterized in that said quality information related to said communication quality is billing information of a user of said terminal.

[Mode 12]
A control device, that sets a processing rule for a packet with respect to at least one forwarding device for forwarding packets, said control device being characterized by comprising:
a request receiving unit that receives an access request transmitted from a terminal for accessing a network in which said forwarding device processes a packet in accordance with said processing rule;
a control unit that generates a processing rule specifying a process of adding quality information related to communication quality with respect to said terminal, to said packet; and
a communication unit that transmits said generated processing rule to said terminal.

[Mode 13]
The control device according to mode 12, characterized in that said control unit determines a processing rule based on a prescribed condition.

[Mode 14]
The control device according to mode 12, characterized in that said control unit determines a processing rule based on a policy corresponding to a user of said terminal.

[Mode 15]
The control device according to mode 12, characterized in that said control unit determines a processing rule based on a communication record of said terminal.

[Mode 16]
The control device according to mode 12, characterized in that said control unit determines a processing rule based on information related to a location of said terminal.

[Mode 17]
The control device according to an one of modes 12 to 16 characterized in that said control unit determines a processing rule in accordance with an access request transmitted via said at least one forwarding device.

[Mode 18]
The control device according to any one of modes 12 to 17, characterized in that said control unit determines a second processing rule corresponding to a first processing rule set for said forwarding device, and
said communication unit transmits said second processing rule to said terminal.

[Mode 19]
The control device according to any one of modes 12 to 18, characterized in that said control unit determines a processing rule for setting in said terminal, generates first information requested by said processing rule, and collates second information received from said terminal and said first information.

[Mode 20]
The control device according to any one of modes 12 to 18, characterized in that said control unit determines a processing rule for setting in said terminal and generates first information requested by said processing rule, and
said communication unit transmits said first information to said forwarding device so as to collate second information transmitted from said terminal to said forwarding device and said first information.

[Mode 21]
The control device according to any one of modes 12 to 20, characterized in that said quality information related to said communication quality is billing information of a user of said terminal.

[Mode 22]
A communication method for controlling at least one terminal communicating via a network including at least one forwarding device for forwarding a packet, and a control device for controlling said forwarding device in accordance with a request from said forwarding device,
said method being characterized by comprising:
a receiving step of receiving a processing rule specifying a process of adding, to a packet, quality information related to service quality with respect to said terminal, from said control device;
a step of storing said received processing rule; and
a processing step of in a case of communicating via said network, adding quality information to a packet in accordance with a processing rule that corresponds to said racket by referring to said stored processing rule.

[Mode 23]
The communication method according to mode 22, characterized in that said receiving step is a step of receiving a processing rule determined by said control device based on a prescribed condition.

[Mode 24]
The communication method according to mode 22, characterized in that said receiving step is a step of receiving a processing rule determined by said control device based on a policy corresponding to a user of said terminal.

[Mode 25]

The communication method according to mode 22, characterized in that said receiving step is a step of receiving a processing rule determined by said control device based on a communication record of said terminal.

[Mode 26]

The communication method according to mode 22, characterized in that said receiving step is a step of receiving a processing rule determined by said control device based on information related to a location of said terminal.

[Mode 27]

The communication method according to mode 22, characterized by further comprising:

a request transmission step of transmitting an access request to said network, wherein said receiving step is a step of receiving a processing rule determined by said control device in accordance with said access request.

[Mode 28]

The communication method according to mode 22, characterized by further comprising:

a request transmission step of transmitting an access request to said network, wherein said receiving step is a step of receiving a processing rule determined by said control device in accordance with said access request transmitted via said forwarding device.

[Mode 29]

The communication method according to mode 22, characterized in that said receiving step is a step of receiving a second processing rule corresponding to a first processing rule set by said control device for said forwarding device.

[Mode 30]

The communication method according to any one of modes 22 to 29, characterized in that said processing step is a step of collating information included in a packet and a stored processing rule, and processing said packet in accordance with a processing rule corresponding to information included in said packet.

[Mode 31]

The communication method according to any one of modes 22 to 30, characterized in that said processing step is a step of generating first information requested by a stored processing rule, and transmitting said first information to said network so that at least one of either said control device or said forwarding device collates said first information and second information requested by said processing rule determined by said control device.

[Mode 32]

The communication method according to any one of modes 22 to 31, characterized in that said quality information related to said communication quality is billing information of a user of said terminal.

[Mode 33]

A communication system, including at least one forwarding device for forwarding a packet, a control device for controlling said forwarding device(s) in accordance with a request from said forwarding device, and at least one terminal communicating via a network including said at least one forwarding device and said control device, said system being characterized in that:

said control device comprises a control unit that determines a processing rule specifying a process of adding, to a packet, quality information related to service quality with respect to said terminal; and said terminal comprises:

a communication unit that receives said processing rule determined by said control device, from said control device;

a memory unit that stores said received processing rule; and a processing unit that in a case of communicating via said network, adding quality information to a packet in accordance with a processing rule that corresponds to said packet by referring to said processing rule stored in said memory unit.

[Mode 34]

A communication module, installed in a terminal communicating via a network including at least one forwarding device for forwarding a packet, and a control device for controlling said forwarding device(s) in accordance with a request from said forwarding device, said module being characterized by comprising:

a communication unit that receives a processing rule specifying a process of adding, to a packet, quality information related to service quality with respect to said terminal, from said control device;

a memory unit that stores said received processing rule; and a processing unit that in a case where said terminal communicates with said network, adding quality information to a packet in accordance with a processing rule that corresponds to said packet by referring to said processing rule stored in said memory unit.

[Mode 35]

A computer program, characterized by executing, in a terminal communicating via a network including at least one forwarding device for forwarding a packet, and a control device for controlling said forwarding device(s) in accordance with a request from said forwarding device:

a process of receiving a processing rule specifying a process of adding, to a packet, quality information related to service quality with respect to said terminal, from said control device;

a process of storing said received processing rule; and a process of in a case where said terminal communicates via said network, adding quality information to a packet in accordance with a processing rule that corresponds to said packet by referring to said stored processing rule.

[Mode 36]

An information processing device, for transmitting to a terminal a computer program for executing, in said terminal that communicates with a network including at least one forwarding device for forwarding a packet, and a control device for controlling said forwarding device(s) in accordance with a request from said forwarding device:

a process of receiving a processing rule specifying a process of adding, to a packet, quality information related to service quality with respect to said terminal, from said control device;

a process of storing said received processing rule; and a process of in a case where said terminal communicates with said network, adding quality information to a packet in accordance with a processing rule that corresponds to said packet by referring to said stored processing rule.

It is to be noted that each disclosure of the abovementioned patent literatures and non-patent literatures is incorporated herein by reference thereto. Modifications and adjustments of exemplary embodiments are possible within the bounds of the entire disclosure (including the scope of the claims) of the present invention, and also based on fundamental technological concepts thereof. Furthermore, a wide variety of combinations and selections of various disclosed elements in the modes, (exemplary embodiments, examples and drawings as well as different claims) is possible within the scope of the claims of the present invention. That is, the present invention clearly includes every type of transformation and modification that a person skilled in the art can realize according to the entire disclosure including the scope of the claims and to technological concepts thereof.

REFERENCE SIGNS LIST

1 Terminal
2 Forwarding Node
3 Control Device
10 Communication Unit
11 Memory Unit
12 Processing Unit
21 Memory Unit
22 Control Device Communication Unit
23 Processing Unit
31 Communication Unit
32 Control Unit
33 Policy Management Unit
40 Node Communication Unit
41 Control Message Processing Unit
42 Processing Rule Management Unit
43 Processing Rule Memory Unit
44 Forwarding Node Management Unit
45 Path-action Calculation Unit
46 Topology Management Unit
47 Terminal Location Management Unit
48 Communication Policy Management Unit
49 Communication Policy Memory Unit
100 Terminal
110 Terminal Control Device
120 Processing Rule Memory Unit
130 Access Control Unit
200 Forwarding Node
300 Policy Management Device
310 Communication Policy Memory Unit
320 Resource Information Memory Unit
330 Authentication Device
400, 400A Control Device
410 Path Control Unit
420 Processing Rule Determination Unit
500, 500A, 500B Network Resource
610 Alteration Judging Unit

What is claimed is:

1. A terminal, communicating via a network including at least one forwarding device for forwarding a packet, and a control device for controlling said forwarding device(s) in accordance with a request from said forwarding device, said terminal comprising:
a communication unit that receives a processing rule specifying a process of adding, to a packet, quality information related to communication quality with respect to said terminal, from said control device;
a memory unit that stores said received processing rule; and
a processing unit that in a case of communicating via said network, adds quality information to a packet in accordance with a processing rule that corresponds to said packet by referring to said processing rule stored in said memory unit,
wherein said processing unit generates first information based on a processing rule stored in said memory unit, and transmits said first information to said network so that at least one of either said control device or said forwarding device collates said first information and second information based on said processing rule determined by said control device.

2. The terminal according to claim 1, wherein said communication unit receives a processing rule determined by said control device based on a prescribed condition.

3. The terminal according to claim 1, wherein said communication unit receives a processing rule determined by said control device based on a policy corresponding to a user of the terminal itself.

4. The terminal according to claim 1, wherein said communication unit receives a processing rule determined by said control device based on a communication record of the terminal itself.

5. The terminal according to claim 1, wherein said communication unit receives a processing rule determined by said control device based on information related to a location of the terminal itself.

6. The terminal according to claim 1, wherein said communication unit further comprises a request transmission function that transmits an access request to said network, wherein said communication unit receives a processing rule determined by said control device in accordance with said access request.

7. The terminal according to claim 1, wherein said communication unit further comprises a request transmission function that transmits an access request to said network, wherein said communication unit receives a processing rule determined by said control device in accordance with said access request transmitted via said forwarding device.

8. The terminal according to claim 1, wherein said communication unit receives from said control device a second processing rule corresponding to a first processing rule set by said control device with respect to said forwarding device.

9. The terminal according to claim 1, wherein said processing unit collates information included in a packet and a processing rule stored in said memory unit, and processes said packet in accordance with a processing rule corresponding to information included in said packet.

10. The terminal according to claim 1, wherein said quality information related to said communication quality comprises billing information of a user of said terminal.

11. A control device, that sets a processing rule for a packet with respect to at least one forwarding device for forwarding packets, said control device comprising:
a request receiving unit that receives an access request transmitted from a terminal for accessing a network in which said forwarding device processes a packet in accordance with said processing rule;
a control unit that generates a processing rule specifying a process of adding quality information related to communication quality with respect to said terminal, to said packet; and
a communication unit that transmits said generated processing rule to said terminal,
wherein said control unit determines a processing rule for setting in said terminal, generates first information requested by said processing rule, and collates second information received from said terminal and said first information.

12. The control device according to claim 11, wherein said control unit determines a processing rule based on a prescribed condition.

13. The control device according to claim 11, wherein said control unit determines a processing rule based on a policy corresponding to a user of said terminal.

14. The control device according to claim 11, wherein said control unit determines a processing rule based on a communication record of said terminal.

15. The control device according to claim 11, wherein said control unit determines a processing rule based on information related to a location of said terminal.

16. The control device according to claim 11, wherein said control unit determines a processing rule in accordance with an access request transmitted via said at least one forwarding device.

17. The control device according to claim 11, wherein said control unit determines a second processing rule corresponding to a first processing rule set for said forwarding device, and said communication unit transmits said second processing rule to said terminal.

18. A control device, that sets a processing rule for a packet with respect to at least one forwarding device for forwarding packets, said control device comprising:
    a request receiving unit that receives an access request transmitted from a terminal for accessing a network in which said forwarding device processes a packet in accordance with said processing rule;
    a control unit that generates a processing rule specifying a process of adding quality information related to communication quality with respect to said terminal, to said packet; and
    a communication unit that transmits said generated processing rule to said terminal,
    wherein said control unit determines a processing rule for setting in said terminal and generates first information requested by said processing rule, and said communication unit transmits said first information to said forwarding device so as to collate second information transmitted from said terminal to said forwarding device and said first information.

19. The control device according to claim 11, wherein said quality information related to said communication quality comprises billing information of a user of said terminal.

20. A communication method for controlling at least one terminal communicating via a network including at least one forwarding device for forwarding a packet, and a control device for controlling said forwarding device in accordance with a request from said forwarding device, said method comprising:
    receiving a processing rule specifying a process of adding, to a packet, quality information related to service quality with respect to said terminal, from said control device;
    storing said received processing rule; and
    processing in a case of communicating via said network, adding quality information to a packet in accordance with a processing rule that corresponds to said packet by referring to said stored processing rule,
    wherein said processing comprises generating first information requested by a stored processing rule, and transmitting said first information to said network so that at least one of either said control device or said forwarding device collates said first information and second information requested by said processing rule determined by said control device.

21. The communication method according to claim 20, wherein said receiving comprises receiving a processing rule determined by said control device based on a prescribed condition.

22. The communication method according to claim 20, wherein said receiving comprises receiving a processing rule determined by said control device based on a policy corresponding to a user of said terminal.

23. The communication method according to claim 20, wherein said receiving comprises receiving a processing rule determined by said control device based on a communication record of said terminal.

24. The communication method according to claim 20, wherein said receiving comprises receiving a processing rule determined by said control device based on information related to a location of said terminal.

25. The communication method according to claim 20, further comprising:
    transmitting an access request to said network,
    wherein said receiving comprises receiving a processing rule determined by said control device in accordance with said access request.

26. The communication method according to claim 20, further comprising:
    transmitting an access request to said network,
    wherein said receiving comprises receiving a processing rule determined by said control device in accordance with said access request transmitted via said forwarding device.

27. The communication method according to claim 20, wherein said receiving comprises receiving a second processing rule corresponding to a first processing rule set by said control device for said forwarding device.

28. The communication method according to claim 20, wherein said processing comprises collating information included in a packet and a stored processing rule, and processing said packet in accordance with a processing rule corresponding to information included in said packet.

29. The communication method according to claim 20, wherein said quality information related to said communication quality comprises billing information of a user of said terminal.

* * * * *